United States Patent
Van Der Merwe et al.

(10) Patent No.: US 10,226,717 B2
(45) Date of Patent: Mar. 12, 2019

(54) METHOD OF RECOVERING SOLVENT FROM TAILINGS BY FLASHING UNDER CHOKED FLOW CONDITIONS

(75) Inventors: Shawn Van Der Merwe, Calgary (CA); Thomas Hann, Onoway (CA)

(73) Assignee: FORT HILLS ENERGY L.P., Calgary (CA)

( * ) Notice: Subject to any disclaimer, the term of this patent is extended or adjusted under 35 U.S.C. 154(b) by 678 days.

(21) Appl. No.: 14/113,143

(22) PCT Filed: Apr. 4, 2012

(86) PCT No.: PCT/CA2012/050213
§ 371 (c)(1),
(2), (4) Date: Oct. 21, 2013

(87) PCT Pub. No.: WO2012/145840
PCT Pub. Date: Nov. 1, 2012

(65) Prior Publication Data
US 2014/0048408 A1 Feb. 20, 2014

(30) Foreign Application Priority Data
Apr. 28, 2011 (CA) ...................................... 2738700

(51) Int. Cl.
*B01D 3/06* (2006.01)
*B01D 1/16* (2006.01)
(Continued)

(52) U.S. Cl.
CPC ................. *B01D 3/06* (2013.01); *B01D 1/16* (2013.01); *C10G 1/045* (2013.01); *B01D 1/20* (2013.01);
(Continued)

(58) Field of Classification Search
CPC ... B01D 1/16; B01D 1/20; B01D 3/06; B01D 3/065; B01D 1/18; B03D 1/1443; C10G 2300/807; C10G 33/06
See application file for complete search history.

(56) References Cited

U.S. PATENT DOCUMENTS

| 181,668 A | 8/1876 | Gregg et al. |
| 654,965 A | 7/1900 | Franke |
| (Continued) | | |

FOREIGN PATENT DOCUMENTS

| CA | 918091 A1 | 1/1973 |
| CA | 918588 A1 | 1/1973 |
| (Continued) | | |

OTHER PUBLICATIONS

A John Brooks Website, Spraying pumping filtering, Automated Retractable Nozzle System, FluidHandlingSolutions.com.*
(Continued)

*Primary Examiner* — Jonathan Miller
*Assistant Examiner* — Jonathan Luke Pilcher
(74) *Attorney, Agent, or Firm* — Marshall, Gerstein & Borun LLP

(57) ABSTRACT

A tailings solvent recovery unit (TSRU) recovers a solvent from a solvent diluted tailings and includes a separation apparatus which has a flash vessel, tailings outlet, solvent outlet and an inlet spray system for supplying the diluted tailings to the flash vessel. The spray nozzle system may include multiple nozzles arranged around the periphery of the flash vessel for flash-atomization over its cross-section of the flashing chamber, a nozzle sized and configured to provide choked flow of the diluted tailings, multiple nozzles each being operable in an on/off mode to regulate a total feed flow, or multiple nozzles associated with a distributor and multiple feed conduits.

41 Claims, 8 Drawing Sheets

(51) Int. Cl.
*B01D 1/20* (2006.01)
*C10G 33/06* (2006.01)
*C10G 33/00* (2006.01)
*C10G 1/04* (2006.01)

(52) U.S. Cl.
CPC .............. *B01D 3/065* (2013.01); *C10G 33/00* (2013.01); *C10G 33/06* (2013.01); *C10G 2300/44* (2013.01)

(56) References Cited

U.S. PATENT DOCUMENTS

| | | |
|---|---|---|
| 1,085,135 A | 1/1914 | Kelly, Jr. |
| 1,147,356 A | 7/1915 | Allen |
| 1,159,044 A | 11/1915 | Kelly, Jr. |
| 1,201,558 A | 10/1916 | Cobb |
| 1,254,562 A | 1/1918 | Allen |
| 1,261,671 A | 4/1918 | Zachert |
| 1,494,375 A | 5/1924 | Reilly |
| 1,754,119 A | 4/1930 | Pink |
| 1,777,535 A | 10/1930 | Walcott Stratford |
| 2,010,008 A | 8/1935 | Bray |
| 2,047,989 A | 7/1936 | William |
| 2,091,078 A | 8/1937 | McKittrick et al. |
| 2,111,717 A | 3/1938 | Young |
| 2,188,013 A | 1/1940 | Pilat et al. |
| 2,240,008 A | 4/1941 | Atwell |
| 2,410,483 A | 11/1946 | Dons et al. |
| 2,853,426 A | 9/1958 | Peet |
| 2,868,714 A | 1/1959 | Gilmore |
| 3,081,823 A | 3/1963 | Constantikes |
| 3,220,193 A | 11/1965 | Sttohmeyer |
| 3,271,293 A | 9/1966 | Clark |
| 3,278,415 A | 10/1966 | Doberenz et al. |
| 3,291,569 A | 12/1966 | Joseph Rossi |
| 3,575,842 A | 4/1971 | Simpson |
| 3,705,491 A | 12/1972 | Foster-Pegg |
| 3,779,902 A | 12/1973 | Mitchell et al. |
| 3,808,120 A | 4/1974 | Smith |
| 3,901,791 A | 8/1975 | Baillie |
| 3,929,625 A | 12/1975 | Lucas |
| 3,954,414 A | 5/1976 | Samson, Jr. et al. |
| 3,957,655 A | 5/1976 | Barefoot |
| 4,013,542 A | 3/1977 | Gudelis et al. |
| 4,035,282 A | 7/1977 | Stuchberry et al. |
| 4,115,241 A | 9/1978 | Harrison et al. |
| 4,116,809 A | 9/1978 | Kizior |
| 4,120,775 A | 10/1978 | Murray et al. |
| 4,140,620 A | 2/1979 | Paulett |
| 4,209,422 A | 6/1980 | Zimmerman et al. |
| 4,210,820 A | 7/1980 | Wittig |
| 4,230,467 A | 10/1980 | Buchwald |
| 4,251,627 A | 2/1981 | Calamur |
| 4,284,242 A * | 8/1981 | Randell .................. F23D 1/005 239/422 |
| 4,314,974 A | 2/1982 | Libby et al. |
| 4,315,815 A | 2/1982 | Gearhart |
| 4,321,147 A | 3/1982 | McCoy et al. |
| 4,324,652 A | 4/1982 | Hack |
| 4,342,657 A | 8/1982 | Blair |
| 4,346,560 A | 8/1982 | Rapier |
| 4,395,330 A | 7/1983 | Auboir et al. |
| 4,410,417 A | 10/1983 | Miller et al. |
| 4,425,227 A | 1/1984 | Smith |
| 4,461,696 A | 7/1984 | Bock et al. |
| 4,470,899 A | 9/1984 | Miller et al. |
| 4,495,057 A | 1/1985 | Amirijafari et al. |
| 4,514,305 A | 4/1985 | Filby |
| 4,518,479 A | 5/1985 | Schweigharett et al. |
| 4,532,024 A | 7/1985 | Haschke et al. |
| 4,539,093 A | 9/1985 | Friedman et al. |
| 4,545,892 A | 10/1985 | Cymbalisty et al. |
| 4,572,781 A | 2/1986 | Krasuk et al. |
| 4,584,087 A | 4/1986 | Peck |
| 4,609,455 A | 9/1986 | Weimer et al. |
| 4,634,520 A | 1/1987 | Angelov et al. |
| 4,640,767 A | 2/1987 | Zajic et al. |
| 4,644,974 A | 2/1987 | Zingg |
| 4,648,964 A | 3/1987 | Leto et al. |
| 4,678,558 A | 7/1987 | Belluteau et al. |
| 4,722,782 A | 2/1988 | Graham et al. |
| 4,726,759 A | 2/1988 | Wegener |
| 4,781,819 A | 11/1988 | Chirinos et al. |
| 4,802,975 A | 2/1989 | Mehlberg |
| 4,822,481 A | 4/1989 | Taylor |
| 4,828,688 A | 5/1989 | Corti et al. |
| 4,859,317 A | 8/1989 | Shelfantook et al. |
| 4,888,108 A | 12/1989 | Farnand |
| 4,906,355 A | 3/1990 | Lechnick et al. |
| 4,929,341 A | 5/1990 | Thirumalachar et al. |
| 4,931,072 A | 6/1990 | Striedieck |
| 4,950,363 A | 8/1990 | Silvey |
| 4,966,685 A | 10/1990 | Hall et al. |
| 4,968,413 A | 11/1990 | Datta et al. |
| 5,022,983 A | 6/1991 | Myers et al. |
| 5,039,227 A | 8/1991 | Leung et al. |
| 5,133,837 A | 7/1992 | Elmore |
| 5,143,598 A | 9/1992 | Graham et al. |
| 5,186,820 A | 2/1993 | Schultz et al. |
| 5,223,148 A | 6/1993 | Tipman et al. |
| 5,236,577 A | 8/1993 | Tipman |
| 5,264,118 A | 11/1993 | Cymerman et al. |
| 5,282,984 A | 2/1994 | Ashrawi |
| 5,298,167 A | 3/1994 | Arnold |
| 5,443,046 A | 8/1995 | White |
| 5,558,768 A | 9/1996 | Ikura et al. |
| 5,645,714 A | 7/1997 | Strand et al. |
| 5,690,811 A | 11/1997 | Davis et al. |
| 5,817,398 A | 10/1998 | Hollander |
| 5,871,634 A | 2/1999 | Wiehe et al. |
| 5,876,592 A | 3/1999 | Tipman et al. |
| 5,879,540 A | 3/1999 | Zinke et al. |
| 5,914,010 A | 6/1999 | Hood et al. |
| 5,937,817 A | 8/1999 | Schanz et al. |
| 5,948,241 A | 9/1999 | Owen |
| 5,954,277 A | 9/1999 | Maciejewski et al. |
| 5,968,349 A | 10/1999 | Duyvesteyn et al. |
| 5,985,138 A | 11/1999 | Humphreys |
| 5,988,198 A | 11/1999 | Neiman et al. |
| 5,997,723 A | 12/1999 | Wiehe et al. |
| 6,004,455 A | 12/1999 | Rendall |
| 6,007,708 A | 12/1999 | Allcock et al. |
| 6,007,709 A | 12/1999 | Duyvesteyn et al. |
| 6,019,888 A | 2/2000 | Mishra et al. |
| 6,036,748 A | 3/2000 | Wallace et al. |
| 6,076,753 A | 6/2000 | Maciejewski et al. |
| 6,110,359 A | 8/2000 | Davis et al. |
| 6,120,678 A | 9/2000 | Stephenson et al. |
| 6,159,442 A | 12/2000 | Thumm et al. |
| 6,214,213 B1 | 4/2001 | Tipman et al. |
| 6,355,159 B1 | 3/2002 | Myers et al. |
| 6,358,403 B1 | 3/2002 | Brown et al. |
| 6,361,025 B1 | 3/2002 | Cincotta et al. |
| 6,391,190 B1 | 5/2002 | Spence et al. |
| 6,482,250 B1 | 11/2002 | Williams et al. |
| 6,497,813 B2 | 12/2002 | Ackerson et al. |
| 6,523,573 B2 | 2/2003 | Robison et al. |
| 6,566,410 B1 | 5/2003 | Zaki et al. |
| 6,746,599 B2 | 6/2004 | Cymerman et al. |
| 6,800,116 B2 | 10/2004 | Stevens et al. |
| 7,152,851 B2 | 12/2006 | Cincotta |
| 7,237,574 B2 * | 7/2007 | Chipman ................ F16K 47/16 138/44 |
| 7,357,857 B2 | 4/2008 | Hart et al. |
| 7,569,137 B2 | 8/2009 | Hyndman |
| 7,690,445 B2 | 4/2010 | Perez-Cordova |
| 7,749,378 B2 | 7/2010 | Iqbal et al. |
| 7,820,031 B2 | 10/2010 | D'Alessandro et al. |
| 7,909,989 B2 | 3/2011 | Duyvesteyn et al. |
| 7,934,549 B2 | 5/2011 | Cimolai |
| 8,133,316 B2 | 3/2012 | Poncelet et al. |
| 8,141,636 B2 | 3/2012 | Speirs et al. |
| 8,147,682 B2 | 4/2012 | Lahaie et al. |
| 8,157,003 B2 | 4/2012 | Hackett et al. |

(56) References Cited

U.S. PATENT DOCUMENTS

| | | | |
|---|---|---|---|
| 8,197,676 B2* | 6/2012 | Kan | C10G 33/04 208/321 |
| 8,252,107 B2 | 8/2012 | Esmaeili et al. | |
| 8,261,831 B2 | 9/2012 | Lockhart et al. | |
| 8,262,865 B2 | 9/2012 | Sharma et al. | |
| 8,312,928 B2 | 11/2012 | Lockhart et al. | |
| 8,343,337 B2 | 1/2013 | Moffett et al. | |
| 8,354,020 B2 | 1/2013 | Sharma et al. | |
| 8,357,291 B2 | 1/2013 | Sury et al. | |
| 8,382,976 B2 | 2/2013 | Moran et al. | |
| 8,394,180 B2 | 3/2013 | Diaz et al. | |
| 8,449,764 B2 | 5/2013 | Chakrabarty et al. | |
| 8,454,821 B2 | 6/2013 | Chakrabarty et al. | |
| 8,455,405 B2 | 6/2013 | Chakrabarty | |
| 8,550,258 B2 | 10/2013 | Bara et al. | |
| 8,585,892 B2 | 11/2013 | Lourenco et al. | |
| 8,741,107 B2* | 6/2014 | Kan | C10G 33/04 196/14.52 |
| 2001/0020649 A1* | 9/2001 | Miquel et al. | 239/310 |
| 2002/0043579 A1 | 4/2002 | Scheybeler | |
| 2003/0089636 A1 | 5/2003 | Marchionna et al. | |
| 2004/0074845 A1 | 4/2004 | Hagino et al. | |
| 2004/0256325 A1 | 12/2004 | Frankiewicz | |
| 2005/0150816 A1 | 7/2005 | Gaston | |
| 2005/0150844 A1 | 7/2005 | Hyndman et al. | |
| 2006/0065869 A1 | 3/2006 | Chipman et al. | |
| 2006/0138055 A1 | 6/2006 | Garner et al. | |
| 2006/0196812 A1 | 9/2006 | Beetge et al. | |
| 2007/0125719 A1 | 6/2007 | Yarbrough | |
| 2007/0180741 A1 | 8/2007 | Bjornson et al. | |
| 2007/0284283 A1 | 12/2007 | Duyvesteyn | |
| 2008/0000810 A1 | 1/2008 | Garner et al. | |
| 2008/0185350 A1* | 8/2008 | Remesat et al. | 210/774 |
| 2008/0210602 A1 | 9/2008 | Duyvesteyn | |
| 2009/0134059 A1 | 5/2009 | Myers et al. | |
| 2009/0200210 A1 | 8/2009 | Hommema | |
| 2009/0200688 A1 | 8/2009 | Cincotta | |
| 2009/0294328 A1 | 12/2009 | Iqbal | |
| 2009/0321322 A1 | 12/2009 | Sharma | |
| 2009/0321324 A1 | 12/2009 | Sharma | |
| 2010/0006474 A1 | 1/2010 | Gaston et al. | |
| 2010/0076236 A1 | 3/2010 | Van Heuzen et al. | |
| 2010/0078306 A1 | 4/2010 | Alhazmy | |
| 2010/0089800 A1 | 4/2010 | MacDonald et al. | |
| 2010/0096297 A1 | 4/2010 | Stevens et al. | |
| 2010/0126395 A1 | 5/2010 | Gauthier | |
| 2010/0126906 A1 | 5/2010 | Sury | |
| 2010/0133149 A1 | 6/2010 | O'Connor et al. | |
| 2010/0147516 A1 | 6/2010 | Betzer-Zilevitch | |
| 2010/0155293 A1 | 6/2010 | Verstraete et al. | |
| 2010/0155304 A1 | 6/2010 | Ding et al. | |
| 2010/0206772 A1 | 8/2010 | Keppers | |
| 2010/0243534 A1 | 9/2010 | Ng et al. | |
| 2010/0258477 A1 | 10/2010 | Kukkonen et al. | |
| 2010/0258478 A1 | 10/2010 | Moran et al. | |
| 2010/0264068 A1 | 10/2010 | Ikebe et al. | |
| 2010/0276341 A1 | 11/2010 | Speirs et al. | |
| 2010/0276983 A1 | 11/2010 | Dunn et al. | |
| 2010/0282642 A1* | 11/2010 | Kan | 208/321 |
| 2010/0298173 A1 | 11/2010 | Smith et al. | |
| 2010/0320133 A1 | 12/2010 | Page et al. | |
| 2011/0005750 A1 | 1/2011 | Boerseth et al. | |
| 2011/0011769 A1 | 1/2011 | Sutton et al. | |
| 2011/0061610 A1 | 3/2011 | Speirs et al. | |
| 2011/0062090 A1 | 3/2011 | Bara | |
| 2011/0089013 A1 | 4/2011 | Sakurai et al. | |
| 2011/0100931 A1 | 5/2011 | Lake et al. | |
| 2011/0127197 A1 | 6/2011 | Blackbourn et al. | |
| 2011/0146164 A1 | 6/2011 | Haney et al. | |
| 2011/0174683 A1 | 7/2011 | Cui et al. | |
| 2011/0219680 A1 | 9/2011 | Wilkomirsky Fuica | |
| 2011/0233115 A1 | 9/2011 | Moran et al. | |
| 2011/0265558 A1 | 11/2011 | Feimer et al. | |
| 2011/0284428 A1 | 11/2011 | Adeyinka et al. | |
| 2012/0000830 A1 | 1/2012 | Monaghan et al. | |
| 2012/0000831 A1 | 1/2012 | Moran et al. | |
| 2012/0029259 A1 | 2/2012 | McFarlane et al. | |
| 2012/0043178 A1 | 2/2012 | Kan | |
| 2012/0074044 A1 | 3/2012 | McFarlane | |
| 2012/0074045 A1 | 3/2012 | Stauffer et al. | |
| 2012/0145604 A1 | 6/2012 | Wen | |
| 2012/0175315 A1 | 7/2012 | Revington et al. | |
| 2012/0217187 A1 | 8/2012 | Sharma et al. | |
| 2012/0288419 A1 | 11/2012 | Esmaeili et al. | |
| 2013/0043165 A1 | 2/2013 | Revington et al. | |
| 2013/0081298 A1 | 4/2013 | Bugg et al. | |
| 2013/0140249 A1 | 6/2013 | Sury et al. | |
| 2013/0168294 A1 | 7/2013 | Chakrabarty et al. | |
| 2013/0313886 A1 | 11/2013 | Van Der Merwe et al. | |
| 2013/0345485 A1 | 12/2013 | Duerr et al. | |
| 2014/0001101 A1 | 1/2014 | Van Der Merwe et al. | |
| 2014/0011147 A1 | 1/2014 | Van Der Merwe | |
| 2014/0048450 A1 | 2/2014 | Van Der Merwe et al. | |
| 2014/0076785 A1 | 3/2014 | Penner et al. | |
| 2014/0083911 A1 | 3/2014 | Van Der Merwe et al. | |

FOREIGN PATENT DOCUMENTS

| | | |
|---|---|---|
| CA | 1027501 A1 | 3/1978 |
| CA | 1055868 | 6/1979 |
| CA | 1059052 A1 | 7/1979 |
| CA | 1072474 A1 | 2/1980 |
| CA | 1081641 A1 | 7/1980 |
| CA | 1111782 A1 | 11/1981 |
| CA | 1165712 A1 | 4/1984 |
| CA | 1237689 A1 | 6/1988 |
| CA | 1245990 A1 | 12/1988 |
| CA | 1247550 | 12/1988 |
| CA | 1249414 A1 | 1/1989 |
| CA | 1263331 A1 | 11/1989 |
| CA | 1267860 A1 | 4/1990 |
| CA | 1272975 A1 | 8/1990 |
| CA | 2012305 A1 | 9/1990 |
| CA | 2029795 A1 | 5/1991 |
| CA | 1291957 C | 11/1991 |
| CA | 1293465 C | 12/1991 |
| CA | 2021185 A1 | 1/1992 |
| CA | 2053016 A1 | 5/1992 |
| CA | 2053086 A1 | 4/1993 |
| CA | 2055213 A1 | 5/1993 |
| CA | 2075108 A1 | 1/1994 |
| CA | 2098656 A1 | 12/1994 |
| CA | 2123076 A1 | 11/1995 |
| CA | 2165865 A1 | 6/1997 |
| CA | 2174801 | 10/1997 |
| CA | 2188264 A1 | 4/1998 |
| CA | 2191517 A1 | 5/1998 |
| CA | 2200899 A1 | 9/1998 |
| CA | 2232929 A1 | 9/1998 |
| CA | 2149737 C | 3/1999 |
| CA | 2217300 A1 | 3/1999 |
| CA | 2254048 A1 | 5/1999 |
| CA | 2195604 C | 11/1999 |
| CA | 2350907 A1 | 5/2000 |
| CA | 2272045 A1 | 11/2000 |
| CA | 2304972 A1 | 10/2001 |
| CA | 2350001 A1 | 12/2002 |
| CA | 2353109 A1 | 1/2003 |
| CA | 2387257 A1 | 11/2003 |
| CA | 2527058 A1 | 3/2004 |
| CA | 2425840 A1 | 10/2004 |
| CA | 2454942 A1 | 7/2005 |
| CA | 2455011 A1 | 7/2005 |
| CA | 2726122 A1 | 7/2005 |
| CA | 2750837 A1 | 7/2005 |
| CA | 2750845 A1 | 7/2005 |
| CA | 2750934 A1 | 7/2005 |
| CA | 2750936 A1 | 7/2005 |
| CA | 2750939 A1 | 7/2005 |
| CA | 2750995 A1 | 7/2005 |
| CA | 2751587 A1 | 7/2005 |
| CA | 2751773 A1 | 7/2005 |
| CA | 2799354 A1 | 7/2005 |
| CA | 2799400 A1 | 7/2005 |

(56) References Cited

FOREIGN PATENT DOCUMENTS

| | | | |
|---|---|---|---|
| CA | 2799739 A1 | 7/2005 | |
| CA | 2520943 A1 | 4/2006 | |
| CA | 2490734 A1 | 6/2006 | |
| CA | 2502329 A1 | 9/2006 | |
| CA | 2521248 A1 | 3/2007 | |
| CA | 2524110 A1 | 4/2007 | |
| CA | 2526336 A1 | 5/2007 | |
| CA | 2567185 A1 | 4/2008 | |
| CA | 2610122 A1 | 5/2008 | |
| CA | 2610124 A1 | 5/2008 | |
| CA | 2573633 A1 | 7/2008 | |
| CA | 2673961 A1 | 7/2008 | |
| CA | 2582059 A1 | 9/2008 | |
| CA | 2588043 A1 | 11/2008 | |
| CA | 2606312 A1 | 4/2009 | |
| CA | 2610052 A1 | 5/2009 | |
| CA | 2616036 A1 | 6/2009 | |
| CA | 2654611 A1 | 8/2009 | |
| CA | 2630392 A1 | 11/2009 | |
| CA | 2669059 A1 | 12/2009 | |
| CA | 2638120 A1 | 1/2010 | |
| CA | 2673981 A1 | 1/2010 | |
| CA | 2673982 A1 | 1/2010 | |
| CA | 2641294 A1 | 4/2010 | |
| CA | 2655852 A1 | 4/2010 | |
| CA | 2683374 A1 | 4/2010 | |
| CA | 2643893 A1 | 5/2010 | |
| CA | 2647855 A1 | 7/2010 | |
| CA | 2649928 A1 | 7/2010 | |
| CA | 2652355 A1 | 8/2010 | |
| CA | 2653032 A1 | 8/2010 | |
| CA | 2653058 A1 | 8/2010 | |
| CA | 2689684 A1 | 8/2010 | |
| CA | 2657360 A1 | 9/2010 | |
| CA | 2657801 A1 | 10/2010 | |
| CA | 2661579 A2 | 10/2010 | |
| CA | 2711136 A1 | 10/2010 | |
| CA | 2666025 A1 | 11/2010 | |
| CA | 2708416 A1 | 12/2010 | |
| CA | 2674246 A1 | 1/2011 | |
| CA | 2708048 A1 | 1/2011 | |
| CA | 2678818 A1 | 3/2011 | |
| CA | 2701317 A1 | 3/2011 | |
| CA | 2717406 A1 | 4/2011 | |
| CA | 2729457 A1 | 7/2011 | |
| CA | 2733862 A1 | 7/2011 | |
| CA | 2705055 A1 | 11/2011 | |
| CA | 2768852 A1 | 11/2011 | |
| CA | 2748477 A1 | 3/2012 | |
| CA | 2752558 A1 | 3/2012 | |
| CA | 2730467 A1 | 8/2012 | |
| CA | 2735311 A1 | 9/2012 | |
| CA | 2737410 A | 10/2012 | |
| CA | 2740935 A | 11/2012 | |
| CN | 1187300 A | 7/1998 | |
| EP | 0059106 A2 | 9/1982 | |
| GB | 587798 A | 5/1947 | |
| GB | 2044796 A | 10/1980 | |
| GB | 2145730 A | 4/1985 | |
| JP | S56150407 A | 11/1981 | |
| JP | S57200402 A | 12/1982 | |
| JP | S6285415 U | 5/1987 | |
| RU | 2065455 C1 | 8/1996 | |
| RU | 2078095 C1 | 4/1997 | |
| RU | 2096438 C1 | 11/1997 | |
| WO | 2007102819 A1 | 9/2007 | |
| WO | 2009111871 A1 | 9/2009 | |
| WO | 2010088388 A1 | 8/2010 | |

OTHER PUBLICATIONS

Schaschke, Carl. (2014). Dictionary of Chemical Engineering. Oxford University Press. p. 67. Online version available at: http://app.knovel.com/hotlink/toc/id:kpDCE00021/dictionary-chemical-engineering/dictionary-chemical-engineering.*

Ashgriz, Nasser (Editor), "Handbook of Atomization and Sprays", 2011, Springer, p. 246-250.*

"Saturated and Subcooled Liquids" Engineers Edge, LLC, www.engineersedge.com, available online at: https://www.engineersedge.com/thermodynamics/saturated_subcooled_liquids.htnn.*

International Search Report in corresponding PCT/CA2012/050213 dated May 14, 2012.

Written Opinion in corresponding PCT/CA2012/050213 dated May 14, 2012.

Andrews et al. "Great Canadian Oil Sands Experience in Commercial Processing of Athabasca Tar Sands" American Chemical Society San Francisco Meeting Apr. 2-5, 1968, p. F5-F18.

Mitchell et al. "The solubility of asphaltenes in hydrocarbon solvents" Fuel, 1973, N. 02, vol. 52, p. 149-152.

Kemp, "Pinch Analysis and Process Integration, A User Guide on Process Integration for the Efficient Use of Energy", Second edition, Elsevier 2007.

Svreck et al "Successfully Specify Three-Phase Separators" Chemical Engineering Progress, Sep. 1994, p. 29-40.

Svreck et al. "Design Two-Phase Separators within the Right Limits" Chemical Engineering Progress, Oct. 1993, p. 53-60.

Fu et al."New technique for determination of diffusivities of volatile hydrocarbons in semi-solid bitumen", Fuel, 1979, vol. 58, August, pp. 557-560.

Kamoun et al."High Speed Shadowgraphy Investigations of Superheated Liquid Jet Atomization", ILASS—Americas 22nd Annual Conference on Liquid Atomization and Spray Systems, Cincinnati Ohio, May 2010.

Duan et al.'s "Numerical Analyses of Flashing Jet Structure and Droplet Size Characteristics" Journal of Nuclear Science and Technology, 2006, vol. 43, No. 3, p. 285-294.

Sou et al., "Effects of Cavitation in a Nozzle on liquid Jet atomization" International Journal of Heat and Mass Transfer; vol. 50, p. 3575-3582, 2007.

Ransom et al., "The relaps choke flow model and application to a large scale flow test", The American Society of Mechanical Engineers, Heat Transfer Division, 1980, Saratoga, New York.

Power,"Froth Treatment: Past, Present &Future" Oil Sand Symposium, University of Alberta, May 3-5, 2004.

Rahmani, "Shear-Induced Growth of Asphaltene Aggregates" Oil Sand Symposium, University of Alberta, May 4, 2004.

Paul et al. "Handbook of Industrial Mixing: Science and Practice" Wiley Interscience 2004, p. 391-477.

Blevins "Applied fluid dynamics handbook", Van Nostrand Reinhold Company 1984, p. 80-83.

Wu et al., "Experimental study on steam plume and temperature distribution for sonic jet" J. Phys.: Conf.Ser. 147 2009, 012079.

Yeon et al., "An Experimental Investigation of Direct Condensation of Steam Jet in Subcooled Water" Journal of Korean Nuclear Society vol. 29, No. 1, pp. 45-57, Feb. 1997 E.

Long et al., "Structure of water/solids/asphaltenes aggregates and effect of mixing temperature on settling rate in solvent-diluted bitumen" Fuel 2004, vol. 83, p. 823-832.

Rahimi et al., "Partial Upgrading of Athabasca Bitumen Froth by Asphaltene Removal", Unitar International Conference on Heavy Crude and Tar Sands, No. 1998.074, p. 1-8.

Hoehenberger, "Water Treatment, Cycle Chemistry, Boiler Operation and Related Problems/Failures on Steam Generator Systems > 30 bar", TÜV SÜD Industry Services, 2006, p. 1-14.

Schroyer, "Understand the Basics of Steam Injection Heating", Chemical Engineering Progress, Hydro-Thermal Corporation, May 1997, p. 1-4.

Prosonix, "Psx Steam Jet Diffuser . . . Technology That Makes a Difference", PSX Jet Diffuser Feb. 9, 2011.

Prosonix, "ProSonix Technical Bulletin", TB-4 Liquid & Steam Pressure Relationship.

Prosonix, "PSX Technical Bulletin", TB-7 Internally Modulated Steam Control 0210.

Prosonix, "Sparging Efficiency vs. Direct Steam Injection", TB-6 Sparging Efficiency & Performance Dec. 10, 2010.

(56) References Cited

OTHER PUBLICATIONS

Siemens, "Pictures of the Future", Spring 2006, Power Plants—Siemens Global Website, http://www.siemens.com/innovation/en/publikationen/publications_pof/pof_spring_2006/infrastructures_articles/power_plants.htm.
George, "Mining for Oil", Scientific American, Mar. 1998, p. 84-85.
Speight, "Deasphalting and Dewaxing Processes", The Chemistry and Technology of Petroleum, Fourth Edition, Chapter 19, CRC Press 2006.
Jeribi et al., "Adsorption Kinetics of Asphaltenes at Liquid Interfaces", Journal of Colloid and Interface Science, vol. 256, Issue 2, Dec. 15, 2002, pp. 268-272.
Branan, "Pocket Guide to Chemical Engineering" Elsevier Science & Technology Books, Nov. 1999.
Perry, "Perry's Chemical Engineers' Handbook" (7th Ed.), 1997.
Clarke et al., "Asphaltenes precipitation from Cold Lake and Athabasca bitumens", Petroleum Science and Technology, 1998, 16:3-4, p. 287-305.
Al-Atar, "Effect of Oil Compatibility and Resins/Asphaltenes Ratio on Heat Exchanger Fouling of Mixtures Containing Heavy Oil", Master Degree Thesis report, The University of British Columbia, Feb. 2000.
Gearhart, "ROSE® process offers energy savings for solvent extraction", Proceedings from the Fifth Industrial Energy Technology Conference vol. II, Houston, TX, Apr. 17-20, 1983, p. 823-835.
Clarke et al., "Asphaltene precipitation: detection using heat transfer analysis, and inhibition using chemical additives" Fuel, vol. 76, Issue 7, May 1997, p. 607-614.
Shell Canada Limited, Application for Approval of the Jackpine Mine-Phase 1, ERCB application No. 1271285, May 2002.
Imperial Oil Ressources Ventures Limited, Application for the Imperial Oil Resources Ventures Limited (Imperial Oil) and ExxonMobil Canada Properties (ExxonMobil Canada) Kearl Oil Sands Project—Mine Development (Kearl Project), ERCB Application No. 1408771, Jul. 12, 2005.
Shell Canada Limited, Application for the Approval of Muskeg River Mine Project, ERCB Application No. 970588, Dec. 19, 1997.
Beckman Coulter, Particle Size and Size Distribution Analysis, Coulter Counter.com, pp. 1-3.
Outokumpu Technology, Slurry particle size analyzer, PSI 200 TM, 2006, pp. 1-8.
Johnson, Particle size distribution in clays, Clays and Clay Minerals, pp. 89-91.
Buckley et al., Solubility of the Least-Soluble Asphaltenes, Asphaltenes, Heavy Oils, and Petroleomics, Springer, 2007, Chapter 16, pp. 401-437.
Gerson et al., The Relation of Surfactant Properties to the Extraction of Bitumen from Athabasca Tar Sand by a Solvent-Aqueous-Surfactant Process, Chemistry for Energy, American Chemical Society, 1979, Chapter 6, pp. 66-79.
Nour et al., Characterization and Demulsification of Water-in-crude Oil Emulsions, Journal of Applied Sciences, vol. 7, issue 10, 2007, pp. 1437-1441.
Malcolmson et al., In-Line Particle Size Measurements for Cement and Other Abrasive Process Environments, for Presentation at the IEEE/PCA 40th Cement Industry Technical Conference, 1998, pp. 1-13.
Bui et al., "Modelling of Viscous Resuspension Using a One-Field Description of Multiphase Flows", Third International Conference on CFD in the Minerals and Process Industries, 2003 pp. 265-268.
Dispersion Technology, Inc., "Model DT-1201 . . . Acoustic and electro-acoustic spectrometer", Particle size and zeta potential measurement.
Csiro Minerals, UltraPS—Ultrasonic Particle Size Analyser, www.minerals.csiro.au.
Wedd, "Determination of Particle Size Distributions Using Laser Diffraction", Educ.Reso. for Part. Techn. 032Q-Wedd, pp. 1-4.

Rahmani et al., "Settling Properties of of Asphaltene Aggregates", Abstract, Energy Fuels, 2005, 19 (3), pp. 1099-1108.
Rahmani et al., "Fractal structure of asphaltene aggregates", Abstract, Journal of Colloid and Interface Science, vol. 285, Issue 2, May 15, 2005, pp. 599-608.
Liang et al., "Experimental and Analytical Study of Direct Contact Condensation of Steam in Water" Nucl. Eng. Des., 147, Issue 3, Apr. 1994, pp. 425-435.
Peramanu et al., "Flow loop apparatus to study the effect of solvent, temperature and additives on asphaltene precipitation" Journal of Petroleum Science and Engineering, vol. 23, Issue 2, Aug. 1999, pp. 133-143.
Fisher et al. "Emergency Relief System Design Using DIERS Technology", American Institute of Chemical Engineers, 1992.
Choked Flow in Control Valves in Liquid Applications, Engineered Software, Inc., from http://kb.eng-software.com/display/ESKB/Choked+Flow+in+Control+Valves+in+Liquid+Applications (2017).
Fluid Flow Basics of Throttling Valves, Cashco, from http://www.controlglobal.com/assets/Media/MediaManager/RefBook_Cashco_Fluid.pdf (1999).
Karami, et al. "Effect of Flashing on Choking," Handbook of Atomization and Sprays, Theory and Applications, pp. 246-250 (2011).
Leung, et al. "A Generalized Correlation for Flashing Choked Flow of Initially Subcooled Liquid," AIChE Journal, 34(4):688-691 (1988).
Liquid Flow in Control Valves—Choked flow, Cavitation and Flashing, from http://www.valln.com/resources/blog/liquid-flow-control-valves-choked-flow-cavitation-and-flashing (2017).
Simpson, "Navigating the Two-Phase Maze," Proceedings of the International Symposium on Runaway Reactions and Pressure Relief Design, Boston, MA, Aug. 2-4, AIChE/DIERS, New York, pp. 394-417 (1995).
Tran, "Applications of Three-Phase Flashing Flow in Design and Study Alumina Digestion Flash Trains," Proceedings of the 7th International Alumina Quality Workshop, 26-31 (2005).
William L. Luyben, "Heat-Exchanger Bypass Control", Ind. Eng. Chem. Res. 2011, 50, 965-973.
Dutta-B, "Principles of Mass Transfer and Separation Processes", p. 344, 2009.
Imran Ali, "Process Heating by Direct Steam Injection", Pharmaceutical Guide; Dec. 2010.
Choung, J. et al., "Effect of Temperature on the Stability of Froth Formed in the Recycle Process Water of Oil Sands Extraction", The Canadian Journal of Chemical Engineering, vol. 82, Aug. 2004, pp. 801-806.
Wiwchar, K. et al., "col. flotation in an oilsand application", Proceedings 36th Annual Meeting of the Canadian Mineral Processors, Ottawa, Ontario, Canada, Jan. 20-22, 2004.
Cleyle, P. et al., "col. Flotation Testing at Suncor Energy Inc.", Oilsand 2006 Conference, CD, University of Alberta, Feb. 22-24, 2006.
Finch, J. et al. "Column Flotation", 1st ed. Pergamon Press, 1990, pp. 1-7, 75-79, 82-89, 148-149, 152-159.
Baczek, "Paste Thickening Design Evolving to Higher Capacities and Efficiencies", International Minimizing Supplement to Paste Tailing Management, Mar. 2007. 16 pages.
Versteeg et al., "An Introduction to Computational Fluid Dynamics: the Finite Volume Method", 2nd Edition, Pearson Prentice Hall, First published 1995 and 2nd Edition published 2007, pp. 9, 33-77, 88-97, 78-87, 98-114, 115, 131-133, 156-164, 186-196, 256-264.
Ferziger et al., "Computational Methods for Fluid Dynamics", 3rd Edition, Springer, 2002, pp. 142-151, 188-206, 226-245, 265-307, 324-328.
Hobbs, D.M., "Optimization of a static mixer using dynamical systems techniques", published 1998, Elsevier Science, Chemical Engineering, vol. 53, No. 18, pp. 3199-3213.
Godard, et al., "A Review of Suncor Energy's Millennium Extraction Process", Proceedings 36th Annual Meeting of the Canadian Mineral Processors, pp. 141-152 (2004).

(56) References Cited

OTHER PUBLICATIONS

Mankowski et al., "Syncrude's Low Energy Extraction Process: Commercial Implementation", Proceedings 31st Annual Meeting of the Canadian Mineral Processors, pp. 154-181 (1999).
"Choked Flow of Gases", O'Keefe Controls Co., pp. 38, 16-18 (2000).

* cited by examiner

METHOD OF RECOVERING SOLVENT FROM TAILINGS BY FLASHING UNDER CHOKED FLOW CONDITIONS

FIELD OF THE INVENTION

The present invention relates to the treatment of oil sands bitumen froth and more precisely to a process and unit for recovering solvent from solvent diluted tailings using spray configurations for distribution of the solvent diluted tailings into a flash vessel.

BACKGROUND OF THE INVENTION

Oil sands extraction processes primarily use hot water mixed with oil sands ore to produce a slurry from which is removed a froth fraction containing bitumen. The bitumen froth, which contains bitumen, water and fine mineral solids, is further processed by adding a diluent solvent to facilitate separation of the bitumen from the other components.

In froth treatment operations, the bitumen froth is mixed with diluent and the diluted froth is supplied to separation vessels to separate an overflow diluted bitumen stream from an underflow solvent diluted tailings stream.

Froth treatment operations thus produce by-products including solvent diluted tailings. The cost and environmental impact preclude directly discharging solvent diluted tailings to tailings ponds. The diluted tailings are thus treated in a tailings solvent recovery unit.

Various tailings solvent recovery units have been proposed and each has its own set of drawbacks and challenges. Many possible recovery schemes are disclosed in the literature. In one process, froth treatment tailings from the froth treatment plant are introduced into a flash vessel with internal shed decks maintained at sub-atmospheric pressures. Steam is introduced below the internals and the major portion of the diluent vaporizes together with water. The flashed vapours are removed and cooled to condense diluent and water which separate by gravity settling. Non-condensed vent gases are withdrawn from the condenser to maintain the sub-atmospheric pressure. The flashed solvent depleted tailings are pumped from the flash vessel to tailings disposal.

Some challenges encountered by known tailings solvent recovery processes result in lower solvent recovery levels than would be desirable. For some processes, the lower recovery is attributable to premature flashing at the feed inlet inducing feed to bypass the shed decks and negating any addition of steam below the shed decks. Other processes which operate the flash vessel at near atmospheric pressures which may permit feed distribution over the shed decks and may increase the steam addition to maintain vessel temperature to about 100° C. can increase naphtha diluent recovery.

Another diluent recovery process investigation flashes feed to a flash temperature such that the enthalpy of vaporized flash components matches enthalpy released from the flash liquid and the flash temperature governs vapour pressures of vaporizing components. Given the relative volatility of diluent hydrocarbons, there may be an expected direct relationship between feed temperature, flash temperature and diluent recovery. However, the investigation identified increased feed temperatures for the same feed flow did not proportionately translate to increased diluent recovery due to increased vaporization of water. Stable operation for the flash column in terms of flash temperature and pressure was found marginally below the boiling point of water for the operating pressure and with small increases in feed enthalpy resulting in upsets as the water essentially boils.

Process upsets affect the flash column in at least two ways. Firstly, boiling on shed decks results in damage to the extent that frequently the shed decks fail structurally. Secondly, the vapour velocity in the column increases by an order of magnitude exceeding design guidelines, such a set out in "*Design Two-Phase Separators within the Right Limits*" W. Svrcek, et al. Chemical Engineering Progress October 1993, to limit entraining solids and bitumen into the overhead system.

In the overhead of the tailings solvent flash column, bitumen acts a binder for the solids to adhere on surfaces in the overhead system. The adherence of solids to components of the overhead system restricts vapour flow to the downstream equipments unit operations such as condensers and separators. The adherence of solids on condenser heat transfer surfaces reduce cooling and condensing of vapours which increases the non-condensed gases to be vented. Directionally, both effects of solids adhering on surfaces in the overhead system increase column pressure which reduces feed flashing resulting in actual diluent recoveries. The contribution of increased steam to improve diluent recoveries due the reduced partial pressure created by the superheated steam can often be largely offset by the increased water vapour reporting an overhead system restricted by the adherence of solids. Over the operating cycle, the deposit of solids causes column performance to deteriorate which can only be regained by shutting down the column and associated systems for repair and cleaning.

As mentioned above, some known processes use flash vessels with internal shed decks to provide a large surface area to facilitate flashing or stripping of diluent from froth treatment tailings. The flash conditions are near the boiling point of water and both feed flow and feed temperature variations occur. For flash columns depending on internal shed decks there are a number of challenges and drawbacks. For instance, high feed flows increase liquid loading on column internals which directionally increases the time required for diluent to separate. In addition, low feed flows can cause short circuiting in the column when feed does not adequately cover internals and permits depositions of froth treatment tailings mineral and bitumen/asphaltenes on internal surfaces. The depositions provide sites to increase corrosion of the shed decks. Furthermore, high feed temperatures which boil the water on the internals with resultant vibrations and shock can lead to structural failure of the shed decks, which can be seen observing shed deck pieces in the bottom of the column. In general, these challenges reflect feed conditions as supplied from the froth treatment plant to the tailings solvent treatment unit.

Other known or proposed units have columns substantially free of internals with an agitated liquid pool with residence time to allow residual solvent to evaporate while limiting foaming. The column generally has an inlet device that finely disperses the feed. Other known or proposed technologies describe specific manifold assemblies for injecting feed in a tailings solvent recovery vessel that may have small openings through which the feed is injected.

In other known units, such as described in US patent application published under No. 2010/0282642 (Kan et al.), a column is provided such that it is substantially free of internals using nozzles with diameters of about 0.5 mm with a precise pressure drop range producing substantially solvent depleted hydrocarbon drops which reduce in size to a precise range after a fall to the bottom of the vessel over a precise time interval. The inlet feed nozzles may be orientated up or down and the column may also have steam nozzles to inject steam counter-currently with respect to the falling droplets. This proposed system may have a number of challenges and drawbacks. For instance, feed to tailings solvent recovery columns can contain some "tram" materials. This tram material may include prehistoric wood and coal which are contained in the bitumen froth and during froth solvent diluent addition the tram material follows the froth treatment tailings stream. Due to screening or grinding limitations, such tram material may be in the range of 10 to 15 mm and thus can cause plugging, clogging or altered flow through nozzles of 0.5 mm. In addition, due to variable feed conditions, controlling the unit for the precise pressure drops, droplet size distribution and evolution over precise drop times may be difficult. Furthermore, feed injection systems and demisting systems are themselves internal to the flash vessel and thus bitumen/asphaltenes can adhere also to their surfaces leading to maintenance and cleaning issues.

There is thus a need for a technology that overcomes at least some of the challenges and drawbacks of what is known in the field.

SUMMARY OF THE INVENTION

The present invention responds to the above need by providing a tailings solvent recovery unit (TSRU) for recovering a solvent from solvent diluted tailings with inlet spray system configurations.

In one embodiment, there is provided a tailings solvent recovery unit (TSRU) for recovering a solvent from a solvent diluted tailings, the TSRU comprising:
  a separation apparatus for receiving the solvent diluted tailings and producing a solvent component and a solvent recovered tailings component, the separation apparatus comprising:
    a flash vessel for flashing the solvent from the solvent diluted tailings, the flash vessel having a bottom section, a top section and side walls extending between the top section and the bottom section and defining a flashing chamber having a cross-section;
    a tailings outlet in fluid communication with the bottom section for releasing the solvent recovered tailings component from the flash vessel;
    a solvent outlet in fluid communication with the top section for releasing the solvent component from the flash vessel as a vaporized solvent;
    an inlet spray system for supplying the solvent diluted tailings to the flash vessel, the spray nozzle system comprising:
      multiple nozzles arranged around a periphery of the side walls of the flash vessel, the multiple nozzles being sized and configured and extending within the flashing vessel for subjecting the solvent diluted tailings to flash-atomization to form a spray of droplets distributed over the cross-section of the flashing chamber.

In one optional aspect, the multiple nozzles are retractable out of the flashing chamber.

In another optional aspect, each of the nozzles is independently retractable out of the flashing chamber.

In another optional aspect, each of the nozzles is operable in an on/off mode to regulate the flash-atomization of the solvent diluted tailings into the flashing chamber.

In another optional aspect, each of the nozzles comprises an upstream section converging toward a throat and a downstream section diverging from the throat.

In another optional aspect, each throat is sized to have an internal cross-sectional diameter between about 20 mm and about 65 mm.

In another optional aspect, each of the nozzles is sized to have a minimum internal cross-sectional diameter above about 20 mm.

In another optional aspect, the flash vessel is a stripping vessel and the separation apparatus further comprises a stripping fluid inlet for supplying stripping fluid into the stripping vessel below the inlet spray system.

In another optional aspect, the inlet spray system further comprises a distributor comprising an inlet for receiving the solvent diluted tailings, multiple outlets for releasing separate feed streams of the solvent diluted tailings; and multiple feed conduits in respective fluid communication with the multiple outlets of the distributor for respectively providing the separate feed streams to the multiple nozzles.

In another optional aspect, the inlet spray system further comprises isolation valves respectively associated with the multiple feed conduits.

In another optional aspect, the isolation valves are have quick-closing functionality with closing speeds between about 5 mm/s and about 15 mm/s.

In another optional aspect, the inlet spray system further comprises flow sensors respectively associated with the multiple feed conduits.

In another optional aspect, each of the flow sensors is coupled to a the isolations valves and configured to close a corresponding one of the isolation valves in response to a step change flow increase of the feed stream of the solvent diluted tailings.

The invention also provides a tailings solvent recovery unit (TSRU) for recovering a solvent from solvent diluted tailings, the TSRU comprising:
  a separation apparatus for receiving the solvent diluted tailings and producing a solvent component and a solvent recovered tailings component, the separation apparatus comprising:
    a flash vessel for flashing the solvent from the solvent diluted tailings, the flash vessel having a bottom section, a top section and side walls extending between the top section and the bottom section and defining a flashing chamber;
    a tailings outlet for releasing the solvent recovered tailings component from the flash vessel;
    a solvent outlet for releasing the solvent component from the flash vessel as a vaporized solvent;
    an inlet spray system for supplying the solvent diluted tailings to the flash vessel, the spray nozzle system comprising:
      a nozzle extending within the flashing chamber for flash-atomizing the solvent diluted tailings therewithin, the at least one nozzle being sized and configured to provide choked flow of the solvent diluted tailings there-through.

In one optional aspect, the nozzle comprises an upstream section converging toward a throat and a downstream section diverging from the throat.

In another optional aspect, the throat is sized to have an internal cross-sectional diameter facilitating the choked flow.

In another optional aspect, the throat is further sized such that the cross-sectional diameter allows passage of tram materials contained in the solvent diluted tailings.

In another optional aspect, the throat is sized to have an internal cross-sectional diameter between about 20 mm and about 65 mm.

In another optional aspect, the TSRU also includes a tailings supply pump and wherein the flash vessel and the tailings supply pump are configured to regulate pressurization of the solvent diluted tailings supplied through the inlet spray system.

In another optional aspect, the flash vessel is a stripping vessel and the separation apparatus further comprises a stripping fluid inlet for supplying stripping fluid into the stripping vessel below the inlet spray system.

In another optional aspect, the inlet spray system comprises a plurality of the nozzles.

In another optional aspect, each of the nozzles is independently retractable out of the flashing chamber.

In another optional aspect, each of the nozzles is operable in an on/off mode to regulate flow of the solvent diluted tailings into the flashing chamber.

In another optional aspect, the inlet spray system further comprises: a distributor comprising an inlet for receiving the solvent diluted tailings, multiple outlets for releasing separate feed streams of the solvent diluted tailings; and multiple feed conduits in respective fluid communication with the multiple outlets of the distributor for respectively providing the separate feed streams to the nozzles.

In another optional aspect, the inlet spray system further comprises isolation valves respectively associated with the multiple feed conduits.

In another optional aspect, the isolation valves are have quick-closing functionality with closing speeds between about 5 mm/s and about 15 mm/s.

In another optional aspect, the inlet spray system further comprises flow sensors respectively associated with the multiple feed conduits.

In another optional aspect, each of the flow sensors is coupled to a the isolations valves and configured to close a corresponding one of the isolation valves in response to a step change flow increase of the feed stream of the solvent diluted tailings.

The invention also provides a tailings solvent recovery unit (TSRU) for recovering a solvent from a solvent diluted tailings, the TSRU comprising:
- a separation apparatus for receiving the solvent diluted tailings and producing a solvent component and a solvent recovered tailings component, the separation apparatus comprising:
  - a flash vessel for flashing the solvent from the solvent diluted tailings, the flash vessel having a bottom section, a top section and side walls extending between the top section and the bottom section and defining a flashing chamber;
  - a tailings outlet for releasing the solvent recovered tailings component from the flash vessel;
  - a solvent outlet for releasing the solvent component from the flash vessel as a vaporized solvent;
  - an inlet spray system for supplying the solvent diluted tailings to the flash vessel, the spray nozzle system comprising:
    - a plurality of nozzles extending within the flashing chamber for flash-atomizing the solvent diluted tailings, each of the nozzles being operable in an on/off mode to regulate a total flow of the solvent diluted tailings into the flashing chamber.

In an optional aspect, each of the nozzles comprises an upstream section converging toward a throat and a downstream section diverging from the throat.

In another optional aspect, each throat is sized to have an internal cross-sectional diameter allowing choked flow.

In another optional aspect, each throat is sized to have an internal cross-sectional diameter between about 20 mm and about 65 mm.

In another optional aspect, the TSRU includes a tailings supply pump and wherein the flash vessel and the tailings supply pump are configured to regulate pressurization of the solvent diluted tailings supplied through the inlet spray system.

In another optional aspect, each of the nozzles is independently retractable.

In another optional aspect, the flash vessel is a stripping vessel and the separation apparatus further comprises a stripping fluid inlet for supplying stripping fluid into the stripping vessel below the inlet spray system.

In another optional aspect, the TSRU includes a controller for controlling the on/off mode of the nozzles so as to maintain constant fluid pressurization.

In another optional aspect, the TSRU includes a controller for controlling the on/off mode of the nozzles so as to maintain choked flow.

In another optional aspect, the inlet spray system further comprises: a distributor comprising an inlet for receiving the solvent diluted tailings, multiple outlets for releasing separate feed streams of the solvent diluted tailings; and multiple feed conduits in respective fluid communication with the multiple outlets of the distributor for respectively providing the separate feed streams to the nozzles.

In another optional aspect, the inlet spray system further comprises isolation valves respectively associated with the multiple feed conduits.

In another optional aspect, the isolation valves are have quick-closing functionality with closing speeds between about 5 mm/s and about 15 mm/s.

In another optional aspect, the inlet spray system further comprises flow sensors respectively associated with the multiple feed conduits.

In another optional aspect, each of the flow sensors is coupled to a the isolations valves and configured to close a corresponding one of the isolation valves in response to a step change flow increase of the feed stream of the solvent diluted tailings.

In another optional aspect, the nozzles are distributed around a periphery of the side walls of the flash vessel.

In another optional aspect, the nozzles are regularly spaced around the periphery.

In another optional aspect, the TSRU includes a common service platform configured around the flash vessel and being proximate to the nozzles and wherein the nozzles are sufficiently spaced around the periphery to permit servicing nozzles from the common service platforms.

The invention also provides a tailings solvent recovery unit (TSRU) for recovering a solvent from a solvent diluted tailings, the TSRU comprising:
- a separation apparatus for receiving the solvent diluted tailings and producing a solvent component and a solvent recovered tailings component, the separation apparatus comprising:
  - a flash vessel for flashing the solvent from the solvent diluted tailings, the flash vessel having a bottom section, a top section and side walls extending between the top section and the bottom section and defining a flashing chamber;
  - a tailings outlet for releasing the solvent recovered tailings component from the flash vessel;
  - a solvent outlet for releasing the solvent component from the flash vessel as a vaporized solvent;

an inlet spray system for supplying the solvent diluted tailings to the flash vessel, the spray nozzle system comprising:
- a plurality of nozzles extending within the flashing chamber for flash-atomizing the solvent diluted tailings;
- a distributor comprising an inlet for receiving the solvent diluted tailings and multiple outlets for releasing separate feed streams of the solvent diluted tailings; and
- multiple feed conduits in respective fluid communication with the multiple outlets of the distributor for respectively providing the separate feed streams to the nozzles.

In one optional aspect, the distributor comprises: a bottom wall having the inlet provided therein; a top wall in opposed relation to the bottom wall; and lateral side walls extending between the top wall and the bottom wall defining a distributor chamber and having the multiple outlets provided in the lateral side walls.

In another optional aspect, the distributor is sized to have a height between the inlet and the top wall that is between about 2 and about 5 times a diameter of the inlet.

In another optional aspect, the distributor is sized to have a diameter of the distributor chamber at least the greater of two times the diameter of the inlet nozzle or with a circumference of at least equal to two times the diameter of the outlet nozzle times the number of outlet nozzles.

In another optional aspect, the outlets are distributed around a periphery of the lateral side walls of the distributor.

In another optional aspect, the outlets are regularly spaced around the periphery.

In another optional aspect, the inlet spray system further comprises isolation valves respectively associated with the multiple feed conduits.

In another optional aspect, the isolation valves are have quick-closing functionality with closing speeds between about 5 mm/s and about 15 mm/s.

In another optional aspect, the inlet spray system further comprises flow sensors respectively associated with the multiple feed conduits.

In another optional aspect, each of the flow sensors is coupled to a the isolations valves and configured to close a corresponding one of the isolation valves in response to a step change flow increase of the feed stream of the solvent diluted tailings.

In another optional aspect, the multiple feed conduits are sized and configured to provide substantially equivalent hydraulic losses from the respective outlets of the distributor to the respective nozzles.

In another optional aspect, at least one of the feed conduits comprise a pressure loss regulation device.

In another optional aspect, the inlet and the outlets of the distributor are sized and configured to avoid settling of minerals contained in the solvent diluted tailings.

In another optional aspect, the TSRU also has a heat exchanger for heating the solvent diluted tailings upstream of the distributor.

In another optional aspect, the flashing chamber is relatively free of internals.

In another optional aspect, the flashing chamber is free of shed decks.

In another optional aspect, the flash vessel is configured and operated at a temperature between about 70° C. and about 110° C.

In another optional aspect, the inlet spray system is configured and operated to a have a pressure drop therethrough between about 150 kPa and about 1000 kPa.

In another optional aspect, the inlet spray system is configured and operated to a have a pressure drop therethrough up to about 700 kPa.

The invention also provides a tailings solvent recovery process for recovering a solvent from a solvent diluted tailings, the process comprising:
- supplying the solvent diluted tailings to a flash vessel having a bottom section, a top section and side walls extending between the top section and the bottom section and defining a flashing chamber having a cross-section, wherein the supplying is performed through multiple nozzles arranged around a periphery of the side walls of the flash vessel, the multiple nozzles being sized and configured and extending within the flash vessel for subjecting the solvent diluted tailings to flash-atomization to form a spray of droplets distributed over the cross-section of the flashing chamber;
- separating the solvent from the solvent diluted tailings in the flash vessel to produce a solvent recovered tailings component and a solvent component;
- releasing the solvent recovered tailings component from the flash vessel; and
- releasing the solvent component from the flash vessel as a vaporized solvent.

The invention also provides a tailings solvent recovery process for recovering a solvent from a solvent diluted tailings, the process comprising:
- supplying the solvent diluted tailings to a flash vessel having a bottom section, a top section and side walls extending between the top section and the bottom section and defining a flashing chamber, wherein the supplying is performed through a nozzle extending within the flashing chamber for flash-atomizing the solvent diluted tailings there-within, the nozzle being sized, configured and supplied with the solvent diluted tailings so as to provide choked flow of the solvent diluted tailings there-through;
- separating the solvent from the solvent diluted tailings in the flash vessel to produce a solvent recovered tailings component and a solvent component;
- releasing the solvent recovered tailings component from the flash vessel; and
- releasing the solvent component from the flash vessel as a vaporized solvent.

The invention also provides a tailings solvent recovery process for recovering a solvent from a solvent diluted tailings, the process comprising:
- supplying the solvent diluted tailings to a flash vessel having a bottom section, a top section and side walls extending between the top section and the bottom section and defining a flashing chamber having a cross-section, wherein the supplying is performed through a plurality of nozzles extending within the flashing chamber for flash-atomizing the solvent diluted tailings;
- operating the nozzles in an on/off mode to regulate a total flow of the solvent diluted tailings into the flashing chamber;
- separating the solvent from the solvent diluted tailings in the flash vessel to produce a solvent recovered tailings component and a solvent component;
- releasing the solvent recovered tailings component from the flash vessel; and
- releasing the solvent component from the flash vessel as a vaporized solvent.

The invention also provides a tailings recovery process for recovering a solvent from a solvent diluted tailings, the process comprising:

> distributing the solvent diluted tailings into separate feed streams;
>
> supplying separate feed streams of the solvent diluted tailings to a flash vessel having a bottom section, a top section and side walls extending between the top section and the bottom section and defining a flashing chamber, wherein each of the separate feed streams is supplied to respective nozzles extending within the flashing chamber for flash-atomizing the solvent diluted tailings;
>
> separating the solvent from the solvent diluted tailings in the flash vessel to produce a solvent recovered tailings component and a solvent component;
>
> releasing the solvent recovered tailings component from the flash vessel; and
>
> releasing the solvent component from the flash vessel as a vaporized solvent.

The processes described above and herein may also be used in conjunction with the TSRUs as described above and herein.

In an optional aspect, the flash vessel has an inert gas inlet for injecting insert gas into the flashing chamber.

In an optional aspect, any one of the TSRUs as described above is a naphtha solvent recovery unit for recovering naphthenic solvent from naphtha diluted tailings.

In another optional aspect, any one of the TSRUs as described above is a paraffinic solvent recovery unit for recovering paraffinic solvent from paraffin diluted tailings.

BRIEF DESCRIPTION OF THE DRAWINGS

Embodiments of the distribution system and the related tailings solvent recovery process according to the present invention are represented in the following Figs.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

The present invention provides a tailings solvent recovery unit (TSRU) and a related process for recovering a solvent from solvent diluted tailings.

Figure 1:
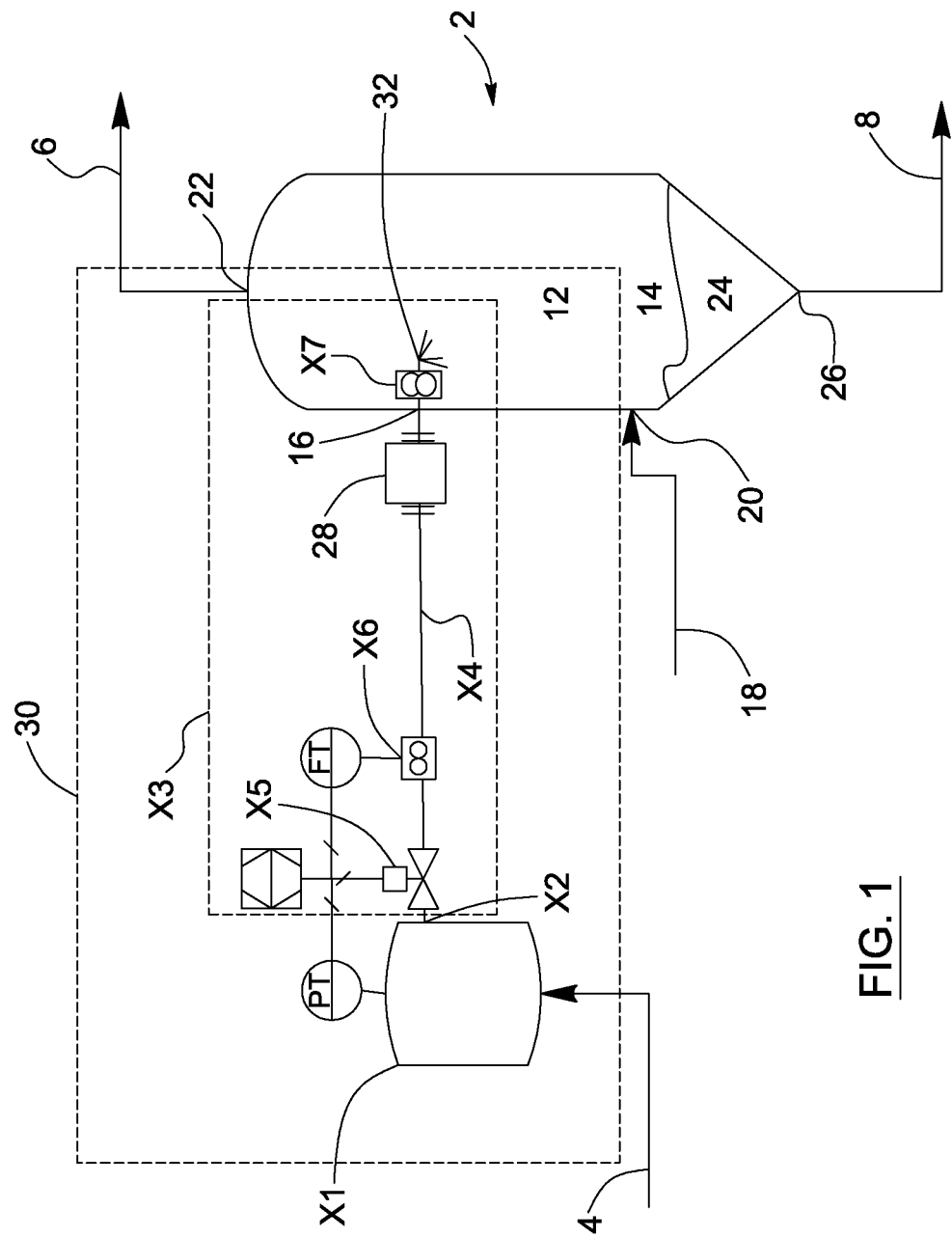
FIG. 1 is a process flow diagram of a TSRU stripping column with a spray nozzle feed system according to an embodiment of the present invention.
Figure 6:
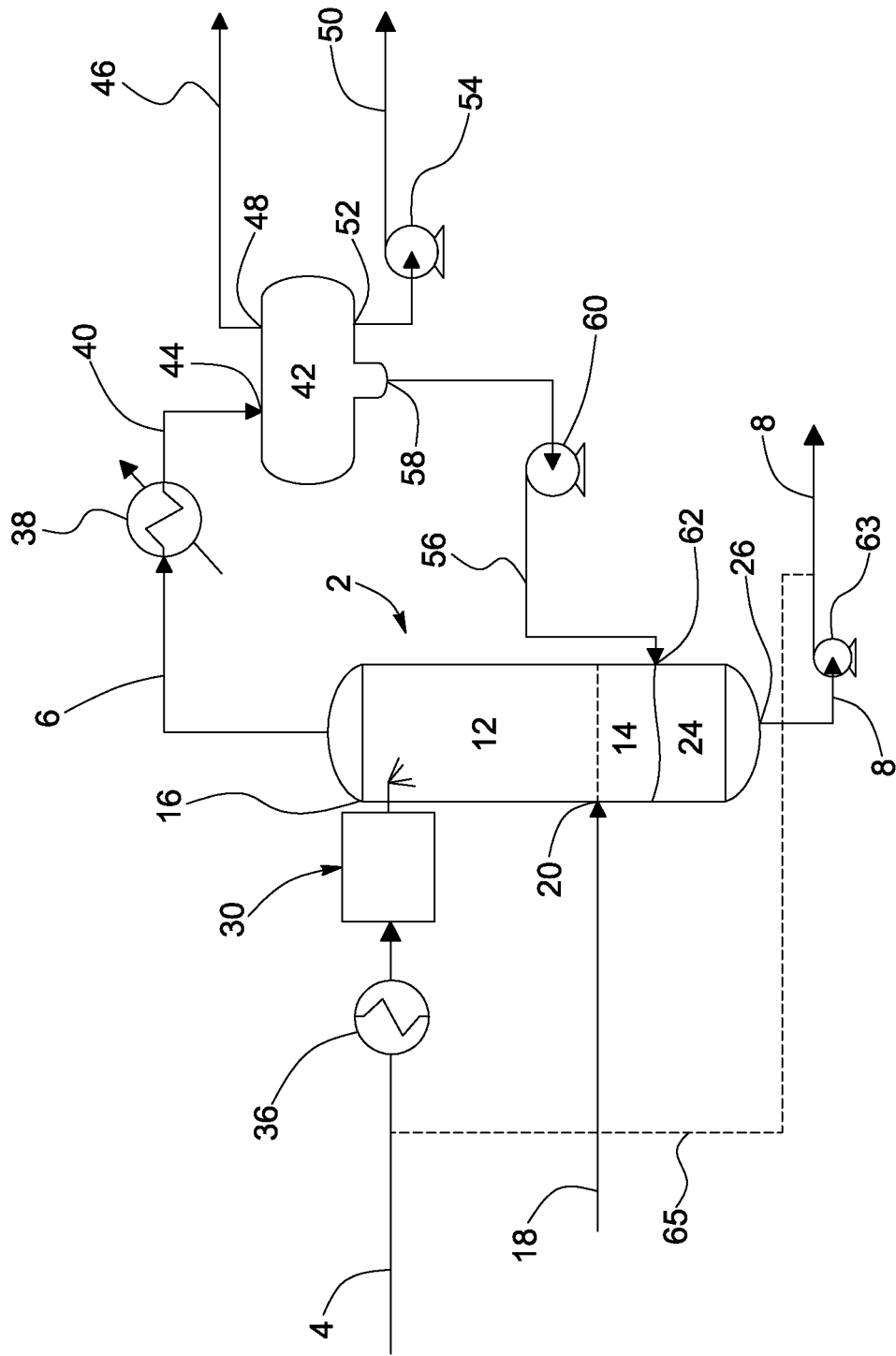
FIG. 6 is a process flow diagram of a TSRU showing a single stripping column according to an embodiment of the present invention.

Referring to FIGS. 1 and 6, the TSRU comprises a separation apparatus (2), which may be a flashing apparatus or preferably a stripping apparatus, for receiving the solvent diluted tailings (4) (which are also referred to herein as solvent diluted tailings and froth treatment tailings) and separate it into two streams: a solvent component (6) and a stripped solvent recovered tailings component (8). The separation apparatus (2) preferably comprises a stripping vessel (2) with a stripping section (12) and a bottom section (14). The solvent diluted tailings (4) are fed to at least one tailings inlet (16) in fluid connection with the stripping section (12) where the stripping occurs by action of a stripping fluid (18) fed to the stripping vessel (2) through a stripping fluid inlet (20) located above the bottom section (14). The stripping fluid (18) preferably comprises or consists of steam. The produced solvent component (6) is released from the stripping vessel through a solvent outlet (22) located at the top of the stripping vessel (2); and the produced solvent recovered tailings component (8) accumulates into a pool (24) in the bottom section (14) of the stripping vessel before exiting the vessel through a tailings outlet (26) located in the bottom section (14). The bottom section (14) may comprise a conical section as illustrated in FIG. 1 or a hemi-spherical head as illustrated in FIG. 6. It should be noted that the stripping vessel (2) could be replaced by a flashing apparatus in which steam is not injected and the solvent flashes due to pressure and temperature conditions within the flashing vessel.

In order to favour stripping of the solvent diluted tailings (4), tailings inlets (16) located in the upper section of the stripping section (12) permit spray systems (30) to flash-atomize solvent diluted tailings (4) into droplets. In one aspect, under the flash-atomizing process, the solvent diluted tailings (4), initially at equilibrium, becomes superheated and the excess heat converts to latent heat of evaporation that vaporizes volatile components such as solvent.

Referring to FIG. 1, the spray system (30) preferably comprises a nozzle feed distributor (X1) and a plurality of spray nozzle systems (X3) extending from outlets (X2) on the nozzle feed distributor (X1) each via a corresponding conduit (X4) to a nozzle head (32) that extends through a corresponding tailing inlet (16) on the stripping column (2). FIG. 1 schematically illustrates one spray nozzle system (X3) in fluid communication between the nozzle feed distributor (X1) and the stripping column (2).

Figure 2B:
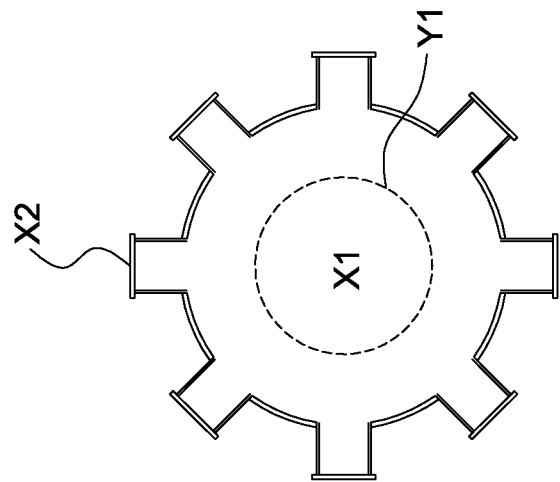
FIGS. 2a to 2b are elevation and side plan view schematics of different configurations of a nozzle feed distributor which can be used in connection with embodiments of the present invention.
Figure 2A:
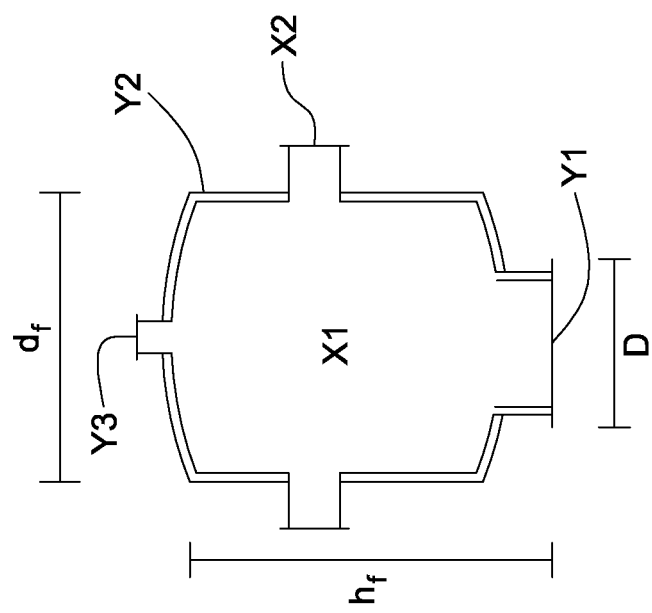

Referring to FIGS. 2a and 2b, the nozzle feed distributor (X1) comprises a plurality of feed outlets (X2) each of which is coupled to a corresponding spray nozzle system for distributing the solvent diluted tailings to multiple locations in the TSRU stripping column. In one aspect, the nozzle feed distributor (X1) may function in an analogous manner to pressure distributors used in cylcopacs to feed multiple cyclones operating in parallel with each producing consistent overflow and underflow streams.

Figure 4:
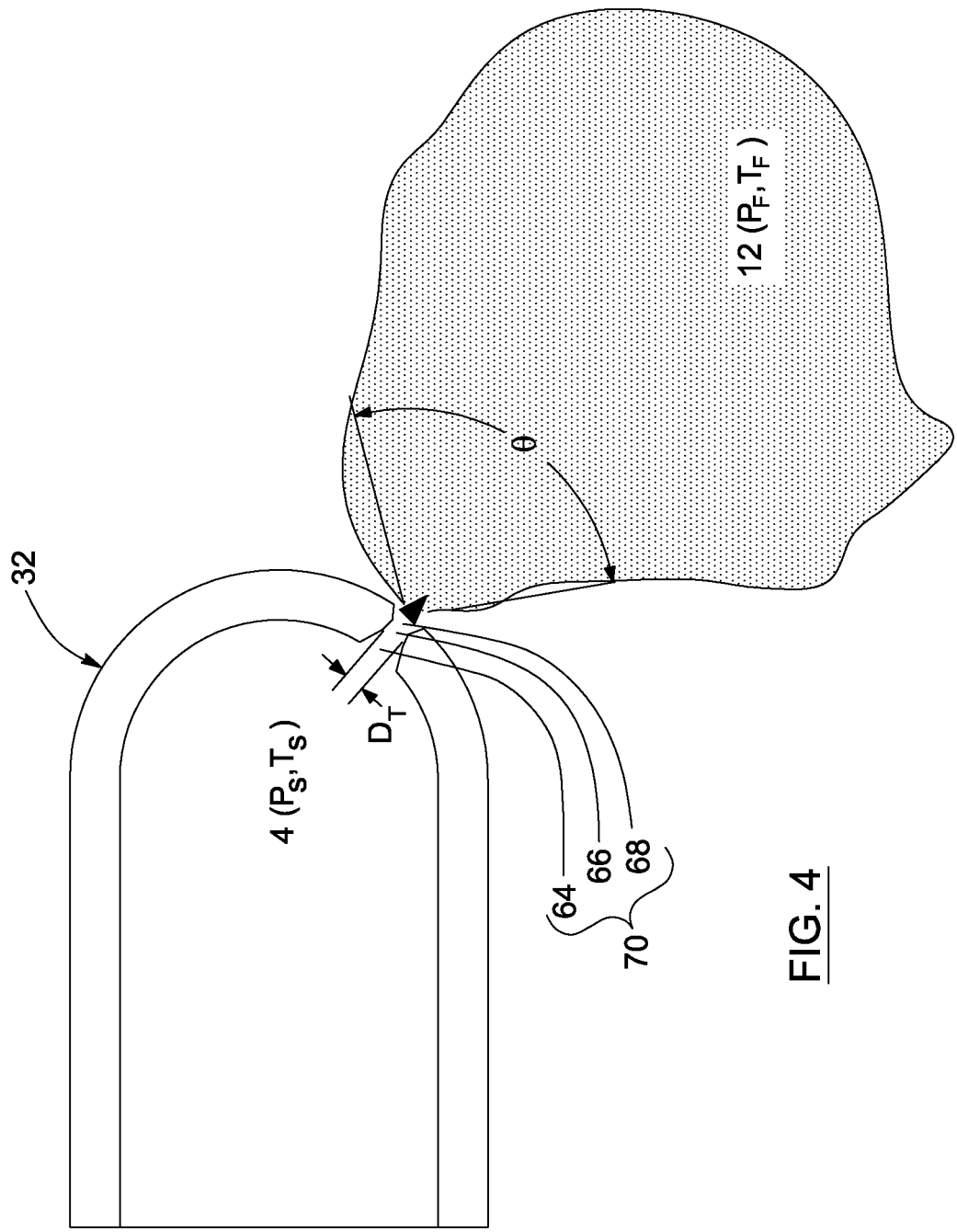
FIG. 4 is a side plan view of a nozzle and spray pattern in connection with an embodiment of the present invention.

Referring to FIG. 2a, the height ($h_f$) of the nozzle feed distributor (X1) between the inlet (Y1) and the top (Y2) of the vessels is configured approximately 2D to 5D and preferably about 3D, where D is the diameter of the inlet (Y1). This preferred dimensional constraint limits the dissipation of the flow stream from inlet (Y1) which is redirected by the top of the nozzle feed distributor (Y2) and the turbulence promotes a high level of mixing with a consistent composition of the solvent diluted tailings (4) to each spray nozzle system (X3).

The nozzle feed distributor as illustrated in FIG. 2*a* receives solvent diluted tailings via the bottom inlet (Y1) which directs the stream off the top wall (Y2) of the nozzle feed distributor (X1). Alternately, it is understood the nozzle feed distributor can be configured with an opposite orientation or a rotated orientation and thus the inlet (Y1) may be on the top or the side of the nozzle feed distributor (X1).

The diameter ($d_f$) of the distributor is preferably provided to be at least about 2D, where D is the diameter of the inlet (Y1) or the number of spray systems (X3) times at least $2D_S$ where $D_S$ is the diameter of spray system conduit (X4), which is illustrated in FIG. 1.

Referring to FIG. 2*b*, the outlets (X2) to each spray system are preferably equally spaced around the perimeter of the nozzle feed distributor (X1) with the at least $D_S$ spacing between each outlet (X2) to provide a number advantages such as improved maintenance and assembly, e.g. access to bolts and associated assembly components for fabrication and maintenance.

The diameters of both inlet (Y1: D) and outlets (X2: $D_S$) for the nozzle feed distributor (X1) depend on settling characteristics of solvent diluted tailings (4) as a mineral containing slurry. The mineral fractions, particularly the sand fraction which are generally considered as particles above 44 μm, settle in piping systems if the velocity is below a critical value. This critical velocity depends on particle size distribution, particle density and fluid properties. The critical velocity sets the minimum flow rate for slurry pipelines. To provide operational flexibility, the slurry pipeline velocities are specified for a higher velocity to permit operational turndown for routine flow variations. However, erosion by sand increases rapidly with velocity. Due the risk of erosion and the attendant risks associated with solvent leaks from piping failures, the specified maximum velocity may limit the turndown availability of the system to less than required by the TSRU in normal operation and may require diluting the solvent tailings (4) or recycling of an internal stream (such as a stripping column bottoms recirculation stream back into the feed line which is shown in dotted line in FIG. 6 to maintain velocities above the minimum critical velocity. In general, the cross sectional area of the inlet (Y1) may be similar to the total cross sectional area for all outlets (X2) deemed operational to meet the flow of solvent diluted tailings (4). One or more outlets (X2) may be assigned as designated installed spares for operational on-line maintenance, not available for processing solvent diluted tailings (4).

In one aspect, the nozzle feed distributor (X1) may be constructed to resist certain erosion conditions. The nozzle feed distributor (X1) is subjected to the turbulence and slurry characteristics of solvent diluted tailings (4) which may result in significant erosion potential. To extend the life expectancy, a nozzle feed distributor (X1) may be lined (Y3) with abrasion resistant such as chrome carbide or tungsten carbide overlays. To facilitate applying the lining (Y3), the top and/or bottom of nozzle feed distributor (X1) maybe flanged to permit access. The nozzle feed distributor (X1) may be configured with two or more operable units in parallel to facilitate balancing system hydraulics and/or maintenance and replacement while reducing process downtime. Where two or more nozzle feed distributors are installed, the feed to may be split by accepted methods for splitting slurry streams from a common train of froth separation vessels or more than one train of froth separation vessels either dedicated to a specific nozzle feed distributor or provided with interconnecting crossover connections.

Referring to FIG. 1, the number of outlets (X2) and associated spray systems (X3) on the nozzle feed distributor (X1) will in part depend on the number of nozzle heads (32) required to meet the solvent tailings (4) flow, the turndown capability of each nozzle head (32) relative to the turndown required by the supply of solvent tailings (4) and the availability of each spray system. The methods to derive the capacity of flash atomizing nozzles are further detailed herein-below. These same methods are applied in specifying the turndown capacity of each nozzle head (32). However, due to pressure and temperature constraints, this turndown limitation may not reflect the required turndown due to variations in solvent tailings (4) supply. Consequently, the minimum number of outlets (X2) or spray systems (X3) preferably steps up or down the number of spray systems in service within the pressure-temperature constraints of the solvent tailing (4) supply. The availability of each spray system (X1) is primarily dependent on life expectancy of the nozzle head (32), which, due to the slurry properties and hydraulic conditions including cavitation of solvent tailings, is limited and requires routine replacement. During these routine replacements the spray system (X1) is not available to process solvent diluted tailings and if the outage coincides with a turndown in solvent diluted tailings the replacement may not affect plant production. However, in one embodiment, one may install one or more spray systems (X3) as spare systems, as may be identified and suggested by a production risk assessment.

Referring to FIG. 1, each spray system (X3) may comprise an isolation valve (X5), a flow sensor (X6), a retractable nozzle system (28) and a conduit (X4) comprising of pipe and fittings connecting the nozzle feed distributor outlet (X2) to the nozzle head (32) that flash-atomizes solvent diluted tailings (4) within the stripping apparatus (2).

The isolation valve (X5) permits the flow of solvent diluted tailings (4) to the specific spray nozzle system (X3) and is operable in fully open or fully closed mode. Due to the inherit risk of a nozzle head (32) failing and resulting in upsetting the distribution of solvent diluted tailings to other spray systems by the flashing of volatile components the isolation valve is preferably an automated quick-closing valve specified with closing speeds in the range of 5 to 15 mm/s.

Referring to FIG. 1, a flow sensor (X6) which may be a non-fluid contact type meter such as ultrasonic or insertion type meters. Such flow sensors may activate the closing of the isolation valve when flow through a spray system has a step change increase or a critical flow rate.

Another function of the isolation valve (X5) may be to open or close flow to spray nozzle systems (28) to maintain the system pressure at the nozzle feed distributor within the operating envelop. Generally, the opening and closing sequence for the isolation valve (X5) may be designed, controlled or programmed to minimize the risk of two or more spray systems failing at the same time by selectively controlling the operating times for each spray system. Another aspect associated with fast acting valves is the potential to induce pressure surges into the feed supply system and, while each valve may involve a limited fraction of the solvent diluted tailings feed, a prudent approach includes reviewing and monitoring the system to determine whether any surge mitigation measures are desired or required.

Still referring to FIG. 1, the conduit (X4) may be made up of the pipe, fittings, valves and other apparatuses, transfers the solvent diluted tailings (4) from the nozzle feed distributor (X1) to the nozzle head (28). Referring to FIG. 4, as stagnation pressure $P_S$ is critical to the operation of a flash-atomizing nozzle and the pressure of the nozzle feed distributor (X1) shown in FIG. 1 represents the pressure control point to each spray system, hydraulic losses in each conduit should be similar. If the hydraulic loss of any conduit (X4) differs significantly from others such that the nozzle head 32 pressure $P_S$ adversely affects nozzle 70 capacity, additional pipe and or fittings may be required to have each spray system with similar hydraulic equivalent lengths. To this end, the conduits may include a pressure loss regulation device for regulating and equalizing the hydraulics of the solvent diluted tailings in the conduits. In another non illustrated aspect, one may split the froth treatment tailings using slurry piping methods and supply a second feed distributor in parallel with the first distributor to provide redundancy and flexibility for plant operations and maintenance. The distributors may alternatively be configured to feed two or more flash vessels. Thus, one distributor may be provided and configured to feed two or more flash vessels or two or more distributors may be provided and configured to feed one or more flash vessels.

Referring to FIG. 1, each spray system (X3) may have a retractable nozzle system (28) to facilitate replacing nozzle head (32) at the end of life while other spray systems maintain the flash atomizing process treatment of solvent diluted tailings. Such retractable systems which are commercially available from suppliers such as John Brooks Company Ltd involve sequences of opening and closing valves and maintenance of seals to prevent ingress of air into a hydrocarbon fuel environment for sub-atmospheric pressure stripping columns (2) or egress of hydrocarbons to the environment for stripping columns (2) operating at, above or below atmospheric conditions.

Figure 3B:
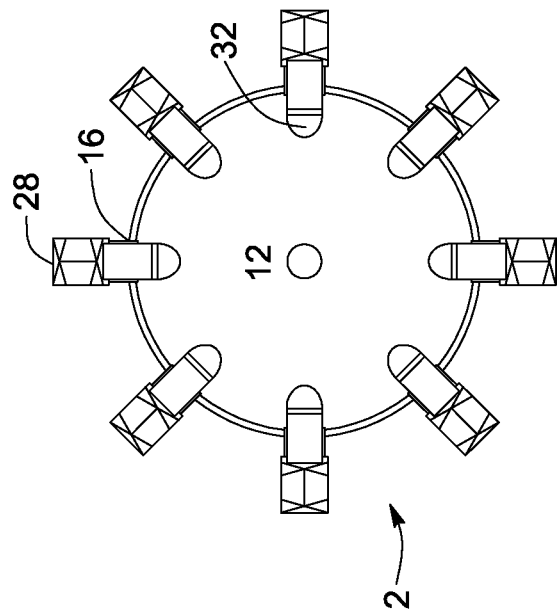
FIGS. 3a to 3b are elevation and side plan view schematics of different configurations of a stripper column which can be used in connection with embodiments of the present invention.
Figure 3A:
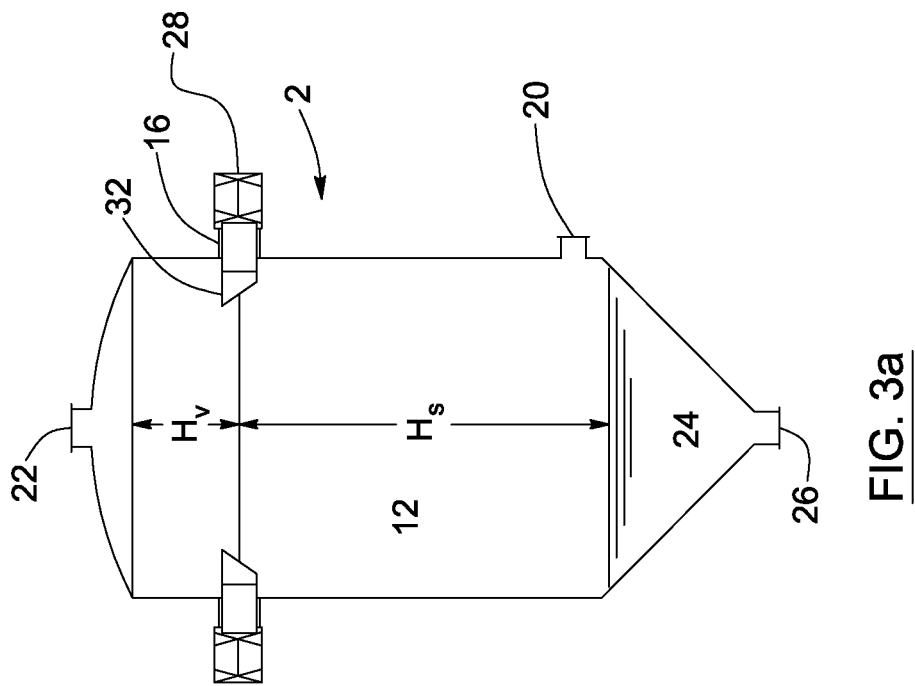

Referring to FIGS. 3*a* and 3*b*, the retractable nozzle system (28), the stripper inlet nozzle (16) and the nozzle head (32) may be equally spaced around the diameter of the stripping column (20. Alternately, spacing between stripper inlets (16) can be set to permit sharing platforms, lifting devices and access routes between two or more retractable nozzle systems (28).

Referring to FIG. 1, each spray system (30) has an optional flow desegregator (X7), which may be constructed as a static mixing element, prior the nozzle head (32). Slurries such as froth treatment tailings are prone on long horizontal pipe runs to gravitational settling across the pipe with lower density components such as solvents concentrating at the top of the pipe and higher density components such as mineral solids concentrating at the bottom of the pipe. Without desegregating the components, the spray nozzle head (32) may be subjected to varying and segregated feed concentrations which affect performance and nozzle life. In addition, the inclusion of elbows and vertical pipe sections upstream of the retractable nozzle system (28) may mitigate the effects of long horizontal pipe runs in lieu of the mixer type desegregator (X7).

Referring to FIG. 1, each spray system (30) preferably has a nozzle head (32) as illustrated in FIG. 4 with one flash-atomizing nozzle (70) that discharges a spray with droplets (12) generally downward and toward the centre of the stripping column (2). Each nozzle (70) preferably comprises a converging section (64), a throat section (66) and a diverging section (68). While two or more flash-atomizing nozzles (70) may be positioned on a single nozzle head (28) subject to spatial and mechanical structural constraints, each nozzle involves two distinct processes: first, the delivery of solvent diluted tailings to the throat (66) of the nozzle (70) and, secondly, jetting of solvent diluted tailings from the throat (66) of the nozzle (70).

The flash-atomization process is a sequential progression of homogeneous and/or heterogeneous nucleation, bubble growth, breakup through bubble disruption and droplet evaporation and occurs when the surrounding liquid conditions suddenly change and drop below liquid saturation conditions resulting in a superheated liquid. The surplus heat quickly cools by latent heat of vaporization the liquid towards the equilibrium temperature.

Figure 5A:
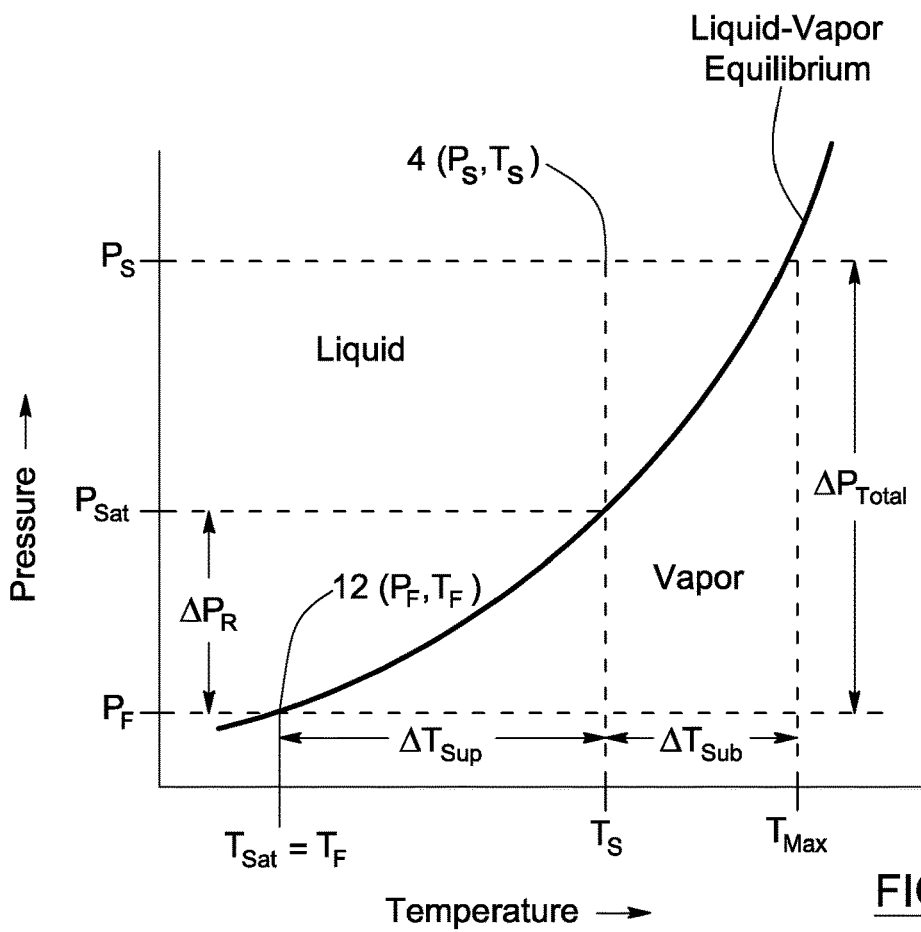
FIGS. 5a, 5b, 5c, 5d, 5e, and 5f are graphs of pressure versus temperature, pressure versus nozzle length, mass velocity versus nozzle $\Delta P/P_S$ ratio, jet length versus temperature, relative frequency versus droplet diameter ratio for different levels of superheat and Sauter mean droplet diameter versus superheat temperature, respectively.

Referring to FIG. 5*a*, which is adapted from H. Kamoun et al.'S article entitled "*High Speed Shadowgraphy Investigations of Superheated Liquid Jet Atomization*", ILASS-Americas 22nd Annual Conference on Liquid Atomization and Spray Systems, Cincinnati Ohio, May 2010 (hereafter referred to as "Kamoun et al."), $\Delta T_{Sup}=T_s-T_{Sat}$ is defined as the degree of superheat where $T_s$ is the liquid temperature upstream of the nozzle and $T_{Sat}$ is the vapour saturation temperature at the nozzle backpressure $P_F$. The degree of superheat is a measure of the temperature excess with respect to the liquid boiling equilibrium. In multi-component streams such as froth treatment tailings, $T_{sat}$ refers to the equilibrium temperature with volatile hydrocarbon components contributing significantly to the associated saturation pressure $P_{Sat}$ of the mixture while water may contribute significantly to enthalpy available for flashing vapour.

A second parameter $\Delta P_R$ is the pressure difference between the superheated liquid $T_S$ and saturated bulk vapour $T_{Sat}$. $\Delta P_R$ represents the generalized driving force for the phase transition and plays a dominate role in boiling. Boiling is considered induced by nucleation and literature such as R. Duan et al.'s "*Numerical Analyses of Flashing Jet Structure and Droplet Size Characteristics*", Journal of Nuclear Science and Technology, Vol. 43, No. 3, p. 285-294, 2006 (hereinafter referred to as "Duan et al."), identifies four different boiling modes: homogenous boiling where nucleation occurs uniformly within liquid having a high degree of superheat, wall boiling where nucleation occurs on the nozzle wall, particle boiling where nucleation occurs on suspended particles or gases, and surface boiling where nucleation occurs exclusively on surfaces of jets. As FIG. 5*a* implies, increasing the superheated liquid $T_S$ increases the driving force to initiate boiling.

Figure 5B:
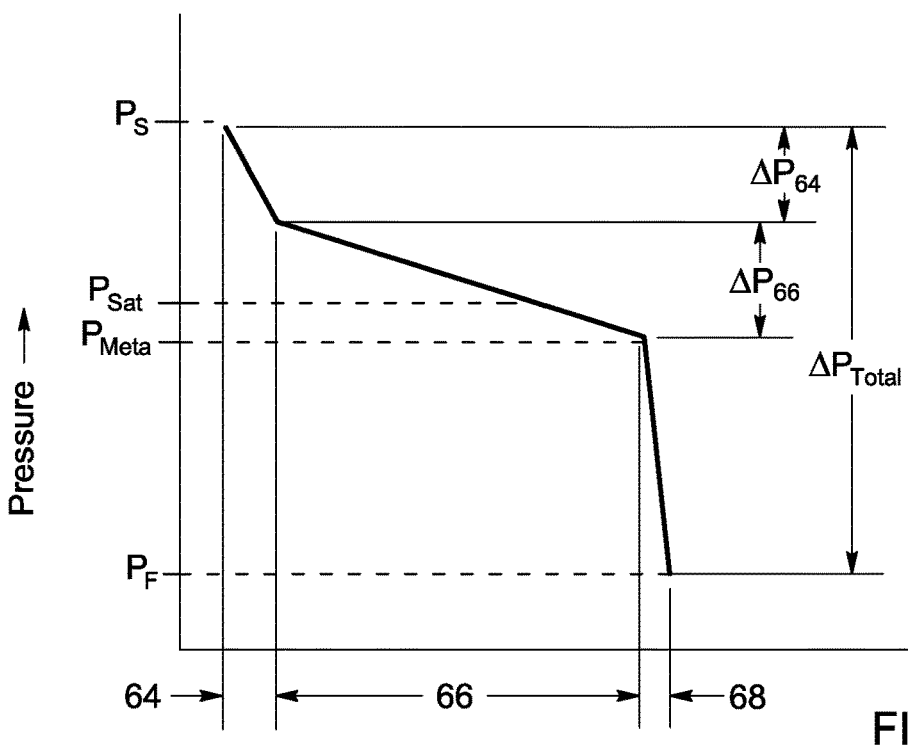
Figure 5C:
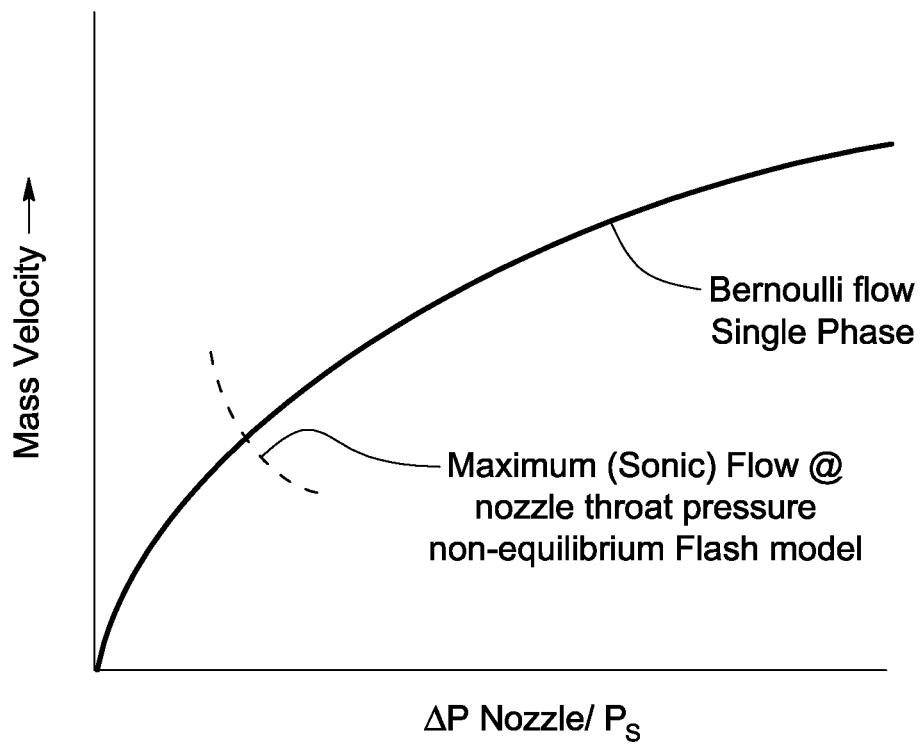

A third parameter $\Delta T_{Sub}=T_F-T_S$ is defined as the degree of sub cooling where $T_F$ is the temperature of the liquid at the nozzle feed pressure $P_F$ and $T_S$ is the liquid saturation temperature at equilibrium pressure $P_{Sat}$. The degree of sub cooling of the liquid determines whether or not a liquid-vapour region occurs within the nozzle.

Referring to FIG. 5*b*, the pressure profile in a nozzle shown in FIG. 4 is illustrated with sub cooled feed and flash atomization at the exit nozzle. With sub cooling, the combined pressure loss from the supply pressure $P_S$ due the entrance effects $\Delta P_{64}$ in the converging section of the nozzle (64) and the throat section $\Delta P_{66}$ of the nozzle throat (66) reduce the pressure to the saturation pressure $P_{Sat}$, the supply temperature $T_S$ near the end of the nozzle throat (66) and metastable effect $P_{Meta}$ delays the flash to the exit of nozzle throat (66). Due to the superheat in the liquid discharging from the nozzle throat (66), the liquid jet rapidly atomizes at a cone angle (θ) in the stripping column (2) and due to the velocity of the jet with abrasive solids the diverging exit section (68) from the nozzle throat (66) is greater than the cone angle (θ).

Referring to FIG. 5*c*, the flow capacity of a nozzle shown in FIG. 4 is illustrated as a nozzle pressure ratio ($\Delta P_{70}=\Delta P_{64}+\Delta P_{66}$)/supply pressure $P_S$) varied for two nozzle flow cases. The single phase flow capacity response reflects the sub cooled pressure profile presented in FIG. 5b and nozzle flow capacity increases with increasing nozzle pressure drop ratio. However, choked two phase flow capacity reduces with increasing nozzle pressure drop ratio because of the discontinuity in sound velocity between liquid and vapour phases that result in vapour phase limiting the nozzle mass flow. The nozzle pressure ratio and the resultant fluid phase changes establish nozzle (70) capacity.

TSRU feed to the nozzle (70) can contain tramp material from the oil sand or upstream operations. While screening or grinding processes can generally minimize particle dimensions in two dimensions, the minimum diameter $D_T$ of the nozzle throat (66) needs to pass these particles or the particles plug the nozzle (70). Generally, the minimum diameter $D_T$ is at least 3 times the dimension of particles passing through installed upstream screens or grinding equipment. This dimension together with the flow rates provides an initial starting basis for specifying nozzle inlet (64) and throat (66) conditions.

In one embodiment, specifying nozzles (70) for a flash atomizing process employs analogous principles to specifying pressure relief valves for liquid service when venting both liquid and vapour phases from chemical reactors under runaway conditions. The safety considerations for these liquid relief valves have resulted in establishing applicable methods for safe but not overly conservative design of emergency relief systems suitable for the discharge of two-phase fluid flow. One manual "*Emergency Relief System Design Using DIERS Technology*", H. Fisher, et al. American Institute of Chemical Engineers, 1992, provides detailed and comprehensive guidelines and recommendations on methods available for specifying relief valves for two-phase vapour-liquid flow. TSRU feed is a complex fluid and as such the specification for the nozzle (70) involves successive iterations. Firstly, the flow path for the nozzle (70) is considered in at least 3 sections: nozzle entrance effects included on FIG. 5b within $\Delta P_{64}$, the converging section (64), and the throat section (66) with further sub divisions these sections as required to aid profiling the phase equilibrium within the nozzle (70). Secondly, the liquid-vapour is determined at each node in the hydraulic path as the near equilibrium condition ($P_{Sat}$) is approached critical flow is assessed. Thirdly, as the near equilibrium condition ($P_{Sat}$) is exceeded the non-equilibrium ($P_{Meta}$) behaviour is incorporated as the wide boiling nature of TSRU feed may permit higher nozzle capacities than estimated by homogeneous equilibrium models.

In addition to the nozzle flow capacity described hereinabove, cavitation within the nozzle and/or the spray assembly (X3) can also adversely affect nozzle capacity. A paper entitled "*Effects of Cavitation in a Nozzle on liquid Jet atomization*" A. Su et al., International Journal of Heat and Mass Transfer; Vol. 50, p. 3575-3582, 2007 (hereinafter referred to as "Su et al.") identifies types of cavitation that may occur within a nozzle and correlates dimensionless cavitation number to Reynolds number. The relationship may identify flow conditions within the nozzle and/or the spray assembly (X3) prone to cavitation which adversely affects equipment component life which may by computational fluid dynamics (CFD) modelling assess strategies to minimize this failure mechanism due to flow transitions created by valves, elbows, flanges and other pipe fittings.

Velocity of the liquid flowing through the nozzle (70), which may range from 7 to 15 m/s, and cavitation that occurs over the nozzle (70) life cycle, give rise to a sever erosion environment. Consequently, it is preferred that the nozzles be fabricated from abrasion resistant materials such as chrome carbide, tungsten carbide or speciality ceramics.

In one preferred embodiment of the present invention, the function of the nozzle (70) is to produce an atomizing jet. In the discharge cone (68) of the nozzle, the rapid drop in pressure superheats the jet stream. By nucleated boiling, the superheated jet as illustrated in FIG. 4 rapidly disintegrates in to a spray. Kamoun et al. provide a model and methods for predicting the spreading spray angle (θ) from the nozzle.

Figure 5D:
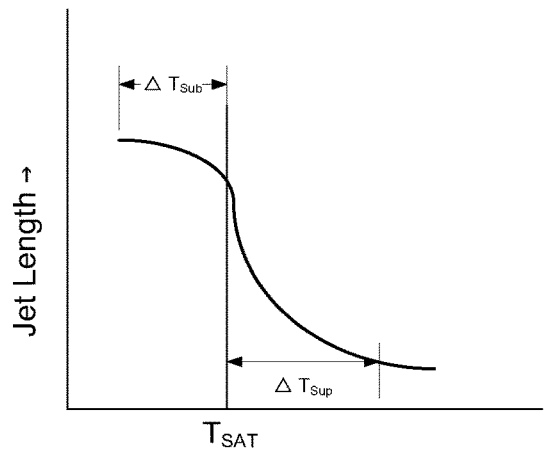
Figure 5E:
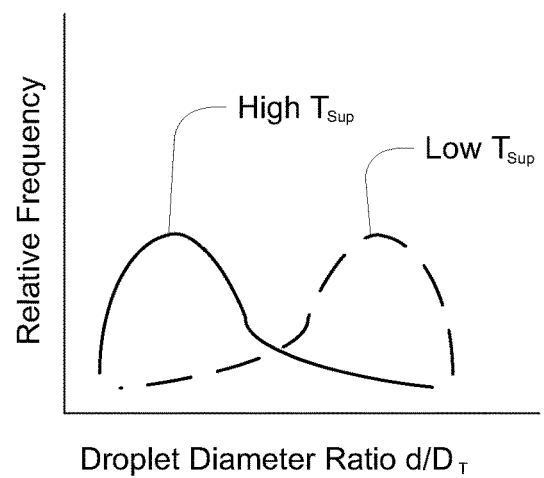
Figure 5F:
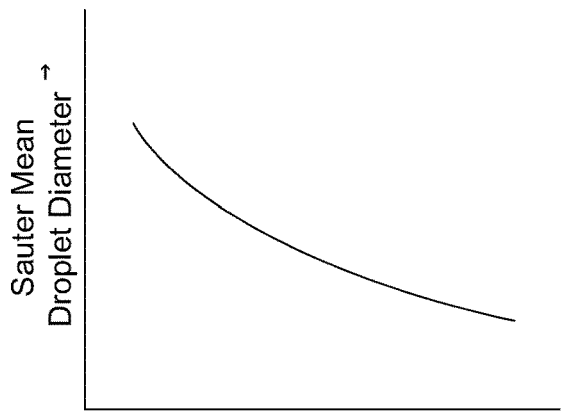

Still referring to FIG. 4, the atomizing jet disintegrates to droplets within the stripping section (12) of the stripping column due to nucleated boiling and high evaporation rates. FIGS. 5d, 5e and 5f, which are adapted from Duan et al., illustrate the role superheat plays on jet length and droplet diameter by their simulation method for estimating droplet sizes from flashing jets. Both the length of the jet and the droplet diameter reduce as superheat increases due to the bifurcation cascade break up of the jet stream. The droplet sizes are useful for estimating interfacial surface areas for multi-phase mass transfer and settling velocities to determine and design diameter of the stripping column. One may increase degree of superheat to reduce droplet diameter, reduce or change distribution pattern, and modify other operating variables. These variables among others may be changed and optimized to affect the droplet size and nozzle operation to tailor the process for specific applications and TSRU operating conditions (e.g. P, T, stage number, nozzle configuration, etc.) using engineering optimization calculation techniques, empirical observations and/or trial and error testing.

Referring now to FIGS. 1 and 3a, the flash atomization process is rapid with droplets settling to the pool (24) in the bottom section (14) of the stripping vessel (2) and being flashed separated within 1 to 2 seconds of spraying. This flash separation time may be used to determine the stripper height ($H_S$) as defined between the elevation of the nozzles (32) and the top of the pool (24).

The vapour velocity which includes optional sparge steam or inert gas (18) above the elevation of the nozzles (32) together with design guidelines such as set out in "*Design Two-Phase Separators within the Right Limits*", W. Svrcek et al., Chemical Engineering Progress October 1993, may be used to determine elevation difference ($H_V$) above the nozzles (32) to limit entraining solids and bitumen into the overhead system.

Referring to FIG. 1, sparge steam or inert gas (18) may be injected into the stripping column (2) via a distribution arrangement above the pool (24). The sparge steam (18) if injected aids the superheating of the vapour to further enhance the flashing of hydrocarbons from the drops. The inert gas (18) if injected may aid reducing the partial pressure of the vapour phase to further enhance the flashing of hydrocarbons from the drops.

Referring to FIGS. 1 and 6, the stripping vessel (2) is preferably operated such that the temperature of the solvent diluted tailings (4) entering the vessel (2) is between about 70° C. and about 110° C. and the pressure drop through the inlet spray system (28) is between about 150 kPa and about 700 kPa. The stripping fluid (18), flowing upward through the stripping section (12), contacts the droplets flowing downward. The size of the droplets offers a high surface area for mass transfer with the stripping fluid (18). The stripping fluid entrains the solvent component (6) as a vaporized solvent up to the solvent outlet (22) whereas the solvent recovered tailings component flows downward through the vessel (2) to the bottom section (14) forming the pool (24) and then being expelled through the outlet (26).

Referring to FIG. 3, preferably each nozzle (32) has an aperture (34) which is substantially round and sized to produce small droplets for spraying into the vessel. The apertures (34) are preferably sized above about 20 mm and preferably between about 20 mm and about 65 mm.

In another optional aspect, each nozzle (32) is independently operable in an on/off mode to partially or completely stop or disrupt the solvent diluted tailings feed in order to regulate the flow in response to variable feed properties or adjust the pressure and pressure drop across the inlet spray system. The inlet spray system may also comprise spare nozzles usable in case of the clogging of operating nozzles.

Referring to FIG. 6, the TSRU may comprise more equipment to improve the process. It is noted that the TSRU optionally has multiple stripping vessels or flashing vessels to complete the processing of the solvent diluted tailings (4). There are preferably two stages, the first stage treating the solvent diluted tailings (4) from the froth treatment settling vessels and the second stage treating the underflow (8) of the first stage in a similar manner to the first stage. FIG. 6 shows only the first stage. The TSRU includes a first stripping apparatus (2) and a heat exchanger (36) enabling the heating of the solvent diluted tailings (4) before entering the stripping vessel (2) through the tailings inlet (16). The vaporized solvent component (6) is further condensed in a condenser (38) thereby producing a condensed solvent (40). The condenser (38) connects the solvent outlet (22) of the stripping vessel (2) to an overhead separator (42) which is used to separate the different components of the condensed solvent (40). The condensed solvent (40) is fed to the overhead separator (42) through a condensed solvent inlet (44) where it is separated into a vent gas (46) released through a gas outlet (48); a recovered solvent (50) which is pumped out through a solvent outlet (52) by a first pump (54); and a produced water (56) which is pumped out the separator (42) through a water outlet (58) by a second pump (60). The water outlet (58) is connected to the stripping vessel (2) to recycle the produced water back to the vessel through a recycle inlet (62). The recycle inlet (62) may be located at or below the upper surface of the pool (24) of the solvent recovered tailings component and under the stripping fluid inlet (20). The TSRU comprises a third pump (63) to pump the solvent recovered tailings (8) out of the stripping vessel (2). Optionally, a portion (65) of the solvent recovered tailings (8) is recycled back to the heat exchanger (36) into the feed of solvent diluted tailings (4) before entering the stripping vessel (2).

In one embodiment, the inlet spray system distributes the feed in the flash vessel without depending on vessel internals to provide the surface area for stripping diluent from solvent diluted tailings. In another aspect, the inlet spray system can be installed with retractable nozzles and with suitable sparing can extend run times. In yet another aspect, the inlet spray system and any and all configurations described herein may also be applied to recovering other types of solvents, such as alkanes from alkane diluted tailings derived from a corresponding froth treatment operation. In another aspect, the inlet spray system, while identified and illustrated for a single stage flash column, can apply to columns in series operation. In another aspect, embodiments of the inlet spray system provide technical advantages including the following. If the feed system does not have a recycle system to maintain constant feed flow to the column, then individual spray nozzle systems could operate in an on/off mode to regulate flash conditions. The spray system can aid in minimizing vessel internals which increases the reliability of the TSRU system. In addition, nozzles with retractable mechanisms permit redundancy with on-line maintenance. Furthermore, the flow nozzles are preferably specified for a throat diameter in the range of 20 to 65 mm to minimize plugging risk from tram material. In addition, the high flow capacity reduces the number of nozzles required. Also, high flash separation of solvent from small droplets of feed precludes the need for additional retention time in the lower liquid pool.

In one embodiment, the selection and placement of spray nozzles are performed to balance passing the maximum sized particle which could plug the nozzle with producing small droplets which generate a large surface area for effective mass transfer to vaporize solvent. Placement of the inlet spray system and sizing of the vessel are such that the droplets have adequate time prior to contacting the pool for the mass transfer to occur.

The inlet spray system may have nozzles structured and configured to provide certain spray characteristics. Referring to FIG. 4, in one embodiment one or each nozzle (32) has an upstream converging section (64), a throat (66) and a downstream diverging section (68) terminating at the aperture. The nozzles may be sized and configured and the temperature and pressure upstream of the nozzle may be controlled such that the tailings feed stream is a sub-cooled one phase liquid, which undergoes a phase change involving at least one vapour phase which creates a discontinuous change in the bulk fluid modulus in the throat when the pressure falls below the saturation pressure of the fluid increasing the velocity. The conditions and construction may be such that the velocity is increased up to choked flow conditions which limits or controls flow through the nozzle. Regarding some principles and notions regarding this phenomenon, one may refer to the paper "*The relaps choke flow model and application to a large scale flow test*", Ransom & Trapp, The American Society of Mechanical Engineers, Heat Transfer Division, 1980 (hereinafter referred to as "Ransom & Trapp"). Reference is particularly made to FIG. 1 of Ransom & Trapp and equation on top of page 10 for critical velocity. Since the nozzles terminate directly into the stripping column, they generate droplets. Water, which has high heat transfer properties, and is contained in the solvent diluted tailings, is highly mixed and contributes heat to the phase change.

In another embodiment, the process is operated to maintain adequate pressure to the nozzle to prevent two-phase flow for improved nozzle performance and longevity.

In another aspect, optional heating of the feed permits more consistent feed to the nozzle.

In yet another embodiment, the solvent diluted tailings (also called "froth treatment tailings") are fed to the stripping column at a specific pressure and temperature for the given specific spray nozzle system. The temperature may be provided by heat exchangers or direct steam injection heaters specifically specified for reliable operation with the solids in froth treatment tailings. The sprays distribute tailings as drops across the diameter of the stripping column.

In another embodiment, the steam or inert gas injected near the bottom of the column aids stripping diluent from the droplets as vapours rises in the column to the overhead systems for diluent recovery. Stripped tailings are collected in the bottom of the column. The column tailings pump maintains the level of stripped tailings in the column to provide adequate suction conditions for the pump.

In another embodiment, in the case that the selected nozzles produce droplets that are sufficiently small so as to be prone to entrainment into the overhead system due to stripping vessel conditions such as pressure, temperature and stripping steam injection rates, it may be advantageous to remove the entrained particles using various systems such as filters or scrubbers which would limit adverse impacts of particulates on the overhead system.

It is noted that the inlet spray system and the nozzles used therewith may be used to retrofit existing TSRUs. However, in the case that a given spray or nozzle system is not suitable for retrofitting into existing columns, for instance due to column height not permitting adequate time for diluent mass transfer to vapour phase, the spray system may be adapted for the given column. In some cases, feed pumps may benefit from replacement or upgrading to match pressure requirements for the selected nozzles.

In another embodiment, when large particles and tram material are present in the feed, there may be digester devices, which may be referred to as "muffin munchers", in order to digest and reduce the size of such particles below the minimum nozzle diameter. Such digesting devices may be cyclones or centrifuges or a combination thereof.

In another aspect, the solvent recovered from the TSRU of the present invention can be reused in the corresponding froth treatment operation.

Finally, it should be understood that the preset invention should not be limited to the aspects and embodiments disclosed and illustrated herein.

The invention claimed is:

1. A tailings solvent recovery process for recovering a solvent from a solvent diluted tailings comprising water, mineral solids, and solvent, the process comprising:
supplying the solvent diluted tailings to a flash vessel having a bottom section, a top section and side walls extending between the top section and the bottom section and defining a flashing chamber, wherein the supplying is performed through a nozzle head extending within the flashing chamber and comprising a wall defining an internal conduit, the nozzle head comprising a nozzle aperture defined through the wall and configured for flash-atomizing the solvent diluted tailings within the flashing chamber, the nozzle aperture being sized, configured and supplied with the solvent diluted tailings so as to provide choked flow of the solvent diluted tailings there-through; and wherein the solvent diluted tailings is subcooled upstream of the nozzle aperture within the internal conduit of the nozzle head;
separating the solvent from the solvent diluted tailings in the flash vessel to produce a solvent recovered tailings component comprising the water and the mineral solids, and a solvent component;
releasing the solvent recovered tailings component from the flash vessel; and
releasing the solvent component from the flash vessel as a vaporized solvent.

2. The tailings solvent recovery process of claim 1, comprising a tailings supply pump and wherein the flash vessel and the tailings supply pump are configured to regulate pressurization of the solvent diluted tailings supplied through the inlet spray system.

3. The tailings solvent recovery process of claim 1, wherein the flash vessel is a stripping vessel and the process further comprises supplying a stripping fluid into the stripping vessel below the inlet spray system.

4. The tailings solvent recovery process of claim 1, wherein the inlet spray system comprises a plurality of the nozzle heads.

5. The tailings solvent recovery process of claim 4, wherein the inlet spray system further comprises:
a distributor comprising an inlet for receiving the solvent diluted tailings, multiple outlets for releasing separate feed streams of the solvent diluted tailings; and
multiple feed conduits in respective fluid communication with the multiple outlets of the distributor for respectively providing the separate feed streams to the nozzle heads.

6. The tailings solvent recovery process of claim 5, wherein the inlet spray system further comprises isolation valves respectively associated with the multiple feed conduits.

7. The tailings solvent recovery process of claim 6, wherein the isolation valves have quick-closing functionality with closing speeds between about 5 mm/s and about 15 mm/s.

8. The tailings solvent recovery process of claim 5, wherein the inlet spray system further comprises flow sensors respectively associated with the multiple feed conduits.

9. The tailings solvent recovery process of claim 8, wherein each of the flow sensors is coupled to the isolations valves and configured to close a corresponding one of the isolation valves in response to a step change flow increase of the feed stream of the solvent diluted tailings.

10. The tailings solvent recovery process of claim 1, wherein the solvent diluted tailings is naphtha diluted tailings.

11. The tailings solvent recovery process of claim 1, wherein the solvent diluted tailings is paraffin diluted tailings.

12. The tailings solvent recovery process of claim 1, wherein the nozzle aperture comprises an upstream section converging toward a throat and a downstream section diverging from the throat.

13. The tailings solvent recovery process of claim 12, wherein the throat is sized to have an internal cross-sectional diameter facilitating the choked flow.

14. The tailings solvent recovery process of claim 13, wherein the throat is further sized such that the cross-sectional diameter allows passage of tram materials contained in the solvent diluted tailings.

15. The tailings solvent recovery process of claim 13, wherein the throat is sized to have an internal cross-sectional diameter between about 20 mm and about 65 mm.

16. The process of claim 1, wherein the nozzle head comprises a plurality of the nozzle apertures.

17. The process of claim 1, wherein the nozzle head comprises a single nozzle aperture.

18. The process of claim 1, wherein the nozzle aperture is provided at a distal end of the nozzle head.

19. The process of claim 1, wherein the nozzle head comprises a straight body portion and a closed end portion.

20. The process of claim 19, wherein the closed end portion is curved.

21. The process of claim 20, wherein the closed end portion has a longitudinal cross-section having a semi-circular shape.

22. The process of claim 20, wherein the nozzle aperture is provided on a lower side of the curved end portion.

23. The process of claim 19, wherein the wall of the nozzle body has a constant wall thickness for the straight body portion and the closed end portion.

24. The process of claim 19, wherein the wall of the nozzle body has an inner surface in contact with the solvent diluted tailings, and the inner surface is continuous for the straight body portion and the closed end portion.

25. The process of claim 1, wherein the nozzle aperture comprises a throat and a downstream section, and wherein the solvent diluted tailings has temperature and pressure characteristics at the throat to delay the flash-atomizing until the exit of the throat in the downstream section.

26. A tailings solvent recovery process for recovering a solvent from a solvent diluted tailings comprising water, mineral solids, and solvent, the process comprising:
   supplying the solvent diluted tailings to a flash vessel having a bottom section, a top section and side walls extending between the top section and the bottom section and defining a flashing chamber having a cross-section, wherein the supplying is performed through a plurality of nozzle heads extending within the flashing chamber, each of the nozzle heads comprising a wall defining an internal conduit and a nozzle aperture defined through the wall and configured for flash-atomizing the solvent diluted tailings, and providing choked flow of the solvent diluted tailings through the nozzle apertures; and wherein the solvent diluted tailings is subcooled upstream of the nozzle apertures within the internal conduits of the corresponding nozzle heads;
   operating the nozzle heads in an on/off mode to regulate a total flow of the solvent diluted tailings into the flashing chamber;
   separating the solvent from the solvent diluted tailings in the flash vessel to produce a solvent recovered tailings component comprising the water and the mineral solids, and a solvent component;
   releasing the solvent recovered tailings component from the flash vessel; and
   releasing the solvent component from the flash vessel as a vaporized solvent.

27. The tailings solvent recovery process of claim 26, wherein the multiple nozzle heads are sized and configured for subjecting the solvent diluted tailings to flash-atomization to form a spray of droplets distributed over the cross-section of the flashing chamber.

28. The tailings solvent recovery process of claim 26, wherein each of the nozzle heads is independently retractable out of the flashing chamber.

29. The tailings solvent recovery process of claim 26, wherein each of the nozzle apertures comprises an upstream section converging toward a throat and a downstream section diverging from the throat.

30. The tailings solvent recovery process of claim 26, wherein the flash vessel is a stripping vessel and the process further comprises supplying a stripping fluid into the stripping vessel below the inlet spray system.

31. The tailings solvent recovery process of claim 26, wherein the inlet spray system further comprises:
   a distributor comprising an inlet for receiving the solvent diluted tailings, multiple outlets for releasing separate feed streams of the solvent diluted tailings; and
   multiple feed conduits in respective fluid communication with the multiple outlets of the distributor for respectively providing the separate feed streams to the multiple nozzle heads.

32. The tailings solvent recovery process of claim 31, wherein the inlet spray system further comprises isolation valves respectively associated with the multiple feed conduits.

33. The tailings solvent recovery process of claim 32, wherein the isolation valves have quick-closing functionality with closing speeds between about 5 mm/s and about 15 mm/s.

34. The tailings solvent recovery process of claim 32, wherein the inlet spray system further comprises flow sensors respectively associated with the multiple feed conduits.

35. The tailings solvent recovery process of claim 24, wherein each of the flow sensors is coupled to the isolation valve and configured to close a corresponding one of the isolation valves in response to a step change flow increase of the feed stream or a critical flow rate of the solvent diluted tailings.

36. The tailings solvent recovery process of claim 26, wherein the solvent diluted tailings is naphtha diluted tailings.

37. The tailings solvent recovery process of claim 26, wherein the solvent diluted tailings is paraffin diluted tailings.

38. The tailings solvent recovery process of claim 26, comprising controlling the on/off mode of the nozzle heads so as to maintain the choked flow.

39. The tailings solvent recovery process of claim 26, comprising controlling the on/off mode of the nozzle heads so as to maintain constant fluid pressurization.

40. A tailings solvent recovery process for recovering a solvent from a solvent diluted tailings comprising water, mineral solids, and solvent, the process comprising:
   supplying the solvent diluted tailings to a flash vessel having a bottom section, a top section and side walls extending between the top section and the bottom section and defining a flashing chamber having a cross-section, wherein the supplying is performed through multiple nozzle heads arranged around a periphery of the side walls of the flash vessel, each of the multiple nozzle heads extending within the flash vessel and comprising a wall defining an internal conduit and a nozzle aperture defined through the wall and configured for subjecting the solvent diluted tailings to flash-atomization to form a spray of droplets distributed over the cross-section of the flashing chamber and to provide choked flow of the solvent diluted tailings through the nozzle apertures, and wherein the multiple nozzle heads are retractable out of the flashing chamber; and wherein the solvent diluted tailings is subcooled upstream of the nozzle apertures within the internal conduits of the corresponding nozzle heads;
   separating the solvent from the solvent diluted tailings in the flash vessel to produce a solvent recovered tailings component comprising the water and the mineral solids, and a solvent component;
   releasing the solvent recovered tailings component from the flash vessel; and
   releasing the solvent component from the flash vessel as a vaporized solvent.

41. A tailings recovery process for recovering a solvent from a solvent diluted tailings comprising water, mineral solids, and solvent, the process comprising:
   distributing the solvent diluted tailings into separate feed streams;
   supplying separate feed streams of the solvent diluted tailings to a flash vessel having a bottom section, a top section and side walls extending between the top section and the bottom section and defining a flashing chamber, wherein each of the separate feed streams is supplied to respective nozzle heads extending within the flashing chamber, each of the nozzle heads comprising a wall defining an internal conduit and a nozzle aperture defined through the wall and configured for flash-atomizing the solvent diluted tailings, and providing choked flow of the solvent diluted tailings through the nozzle apertures; and wherein the solvent diluted tailings is subcooled upstream of the nozzle apertures within the internal conduits of the corresponding nozzle heads;

separating the solvent from the solvent diluted tailings in the flash vessel to produce a solvent recovered tailings component comprising the water and the mineral solids, and a solvent component;

releasing the solvent recovered tailings component from the flash vessel; and releasing the solvent component from the flash vessel as a vaporized solvent.

* * * * *